Nov. 3, 1953  
W. A. MALTHANER ET AL  
2,658,188  
PULSE POSITION DIALING SYSTEM WITH  
DIRECT TIME MEASURING APPARATUS  
Filed June 29, 1948  
12 Sheets-Sheet 1
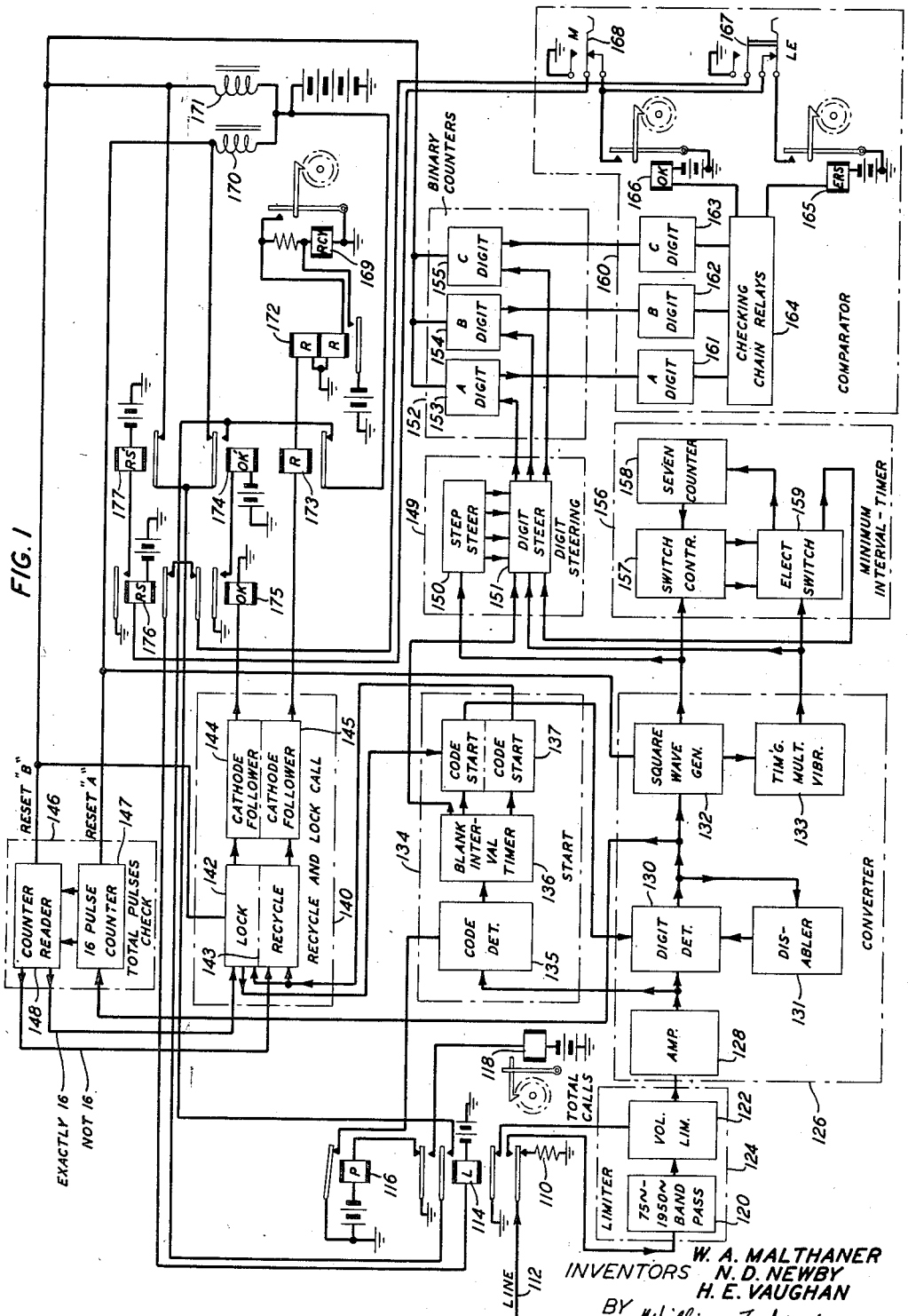
INVENTORS W. A. MALTHANER  
N. D. NEWBY  
H. E. VAUGHAN  
BY William F. Simpson  
ATTORNEY

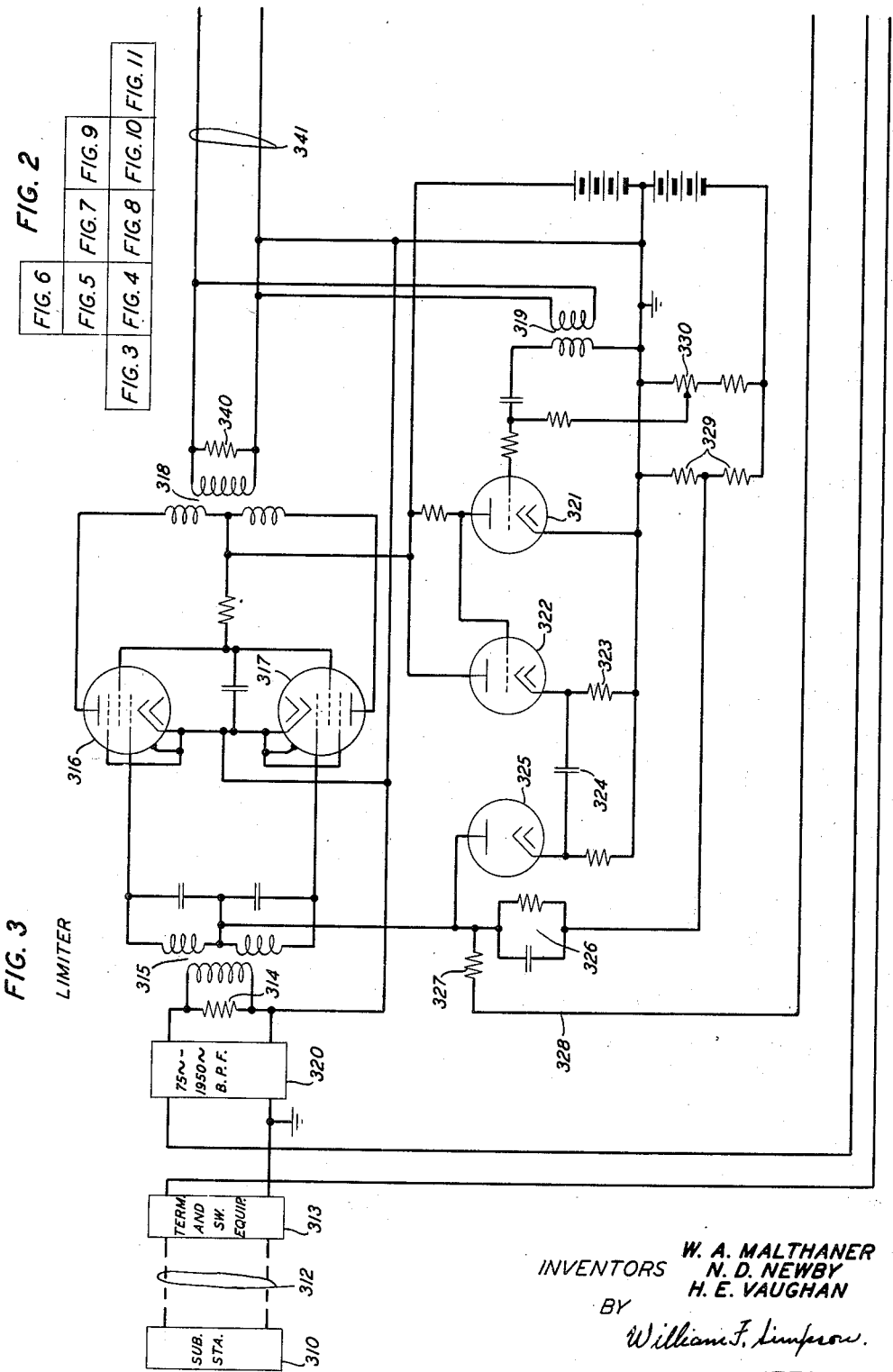

INVENTORS W. A. MALTHANER
N. D. NEWBY
H. E. VAUGHAN
BY William F. Simpson
ATTORNEY INVENTORS W. A. MALTHANER
N. D. NEWBY
H. E. VAUGHAN
BY William F. Simpson
ATTORNEY

UNITED STATES PATENT OFFICE 2,658,188

PULSE POSITION DIALING SYSTEM WITH DIRECT TIME MEASURING APPARATUS

William A. Malthaner, Summit, Neal D. Newby, Leonia, and Henry E. Vaughan, Chatham, N. J., assignors to Bell Telephone Laboratories, Incorporated, New York, N. Y., a corporation of New York Application June 29, 1948, Serial No. 35,924

25 Claims. (Cl. 340—168)

This invention relates to calling and signaling methods, apparatus and systems, and more particularly to improvements in the methods, apparatus and systems disclosed in patent application of Vaughan, Serial No. 35,911, filed on June 29, 1948, the same date herewith, and issued as United States Patent 2,603,715 on July 15, 1952. Novel features disclosed but not claimed herein may be claimed in said Vaughan application.

The signaling and calling arrangements in accordance with the present invention may be advantageously employed in automatic telephone switching systems wherein a subscriber initiates a call and directs automatic switching equipment at distant switching points to establish connections to the desired called party's line.

In the calling arrangements commonly employed in telephone switching systems, direct current is interrupted by means of a dial or other calling device to form direct current or low frequency pulses. This method of calling and signaling is slower than the required time for the operation of automatic switching equipment so that a considerable part of the time of establishing a connection is due to the time required to transmit the calling pulses to the central office.

Furthermore, in the usual systems in the prior art, the direct current or low frequency pulses are incapable of being transmitted through and over voice frequency communication paths.

An object of the present invention is to provide calling and signaling methods, circuits, apparatus and systems which operate at high speed and employ pulses capable of being transmitted over voice frequency communication paths of the type normally employed in telephone systems, whereby the time required for establishing connections through the switching system may be materially reduced and the efficiency of the switching equipment accordingly increased with the resultant lower cost of establishing each connection therethrough.

More particularly the present invention is directed to methods, systems and apparatus for receiving signaling pulses transmitted at a high rate of speed over voice frequency communication paths from subscribers' stations.

In accordance with the exemplary embodiment of the invention set forth in detail hereinafter, the signaling or calling pulses represent subscriber station designations. In the usual type of telephone switching equipment, these designations comprise a number or frequently an office designation of one or more letters and numbers followed by still another number. These designations are in turn sometimes followed by another letter or number which is employed to designate a particular party connected to a party line.

It is, of course, possible to designate the called subscribers' stations by any suitable symbol or group of symbols forming a code or designation.

In order that these designations may be more readily referred to, it is assumed that each designation comprises a number of elements which in the exemplary embodiment set forth herein is eight. Each of these elements is referred to as a symbol or digit. In order to avoid further ambiguity in descriging the operation of the system in response to the various signals representing the symbols or digits, the designation will be described as comprising a number of digital positions, that is, eight digital positions in the exemplary embodiment set forth herein and each of the digits or symbols in each of the digital positions or symbol positions may comprise a digit of any one of a plurality of different magnitudes or symbols of different characteristics.

In accordance with the specific embodiment set forth herein, each element or digital position is represented by two pulses of short duration in which the time interval elapsing between the two pulses represents the magnitude of the digit or the characteristic of the symbol.

Each of the pulses is of sufficiently short duration that they may be readily transmitted over voice frequency communication paths through repeat coils, filters, amplifiers and other equipment associated with voice frequency communication paths. These pulses may also be transmitted through modulating equipment and then over carrier current and radio systems in the same manner as voice frequecy currents as is well understood by persons skilled in the art.

The arrangement set forth herein in detail is designed to cooperate with a source of such pulses wherein the pulses representing the number or designation of the called station is repeated over and over again so that the problems of starting the calling equipment at the subscriber station under control of equipment at the central station are eliminated. A suitable form of pulse generating equipment for generating pulses at the subscriber station with which the exemplary embodiment set forth herein is designed to cooperate is disclosed in an application of Parkinson, Serial No. 35,930, filed June 29, 1948, the same date herewith and issued as United States Patent 2,597,898 on May 27, 1952.

In systems of this type it is necessary to distinguish or recognize the beginning of each complete station designation so that the digits may be placed in their proper position in the called subscriber's station designation. In order that this may be accomplished, the pulse generating equipment at the subscriber station is arranged to interpose delays or pauses in transmission between each series of pulses representing a complete subscriber's designation.

A feature of the present invention is directed to the equipment for recognizing these pauses and for properly conditioning receiving equipment in response to such pauses to receive the following series of pulses designating the called subscriber station.

As set forth in the above-identified application of Vaughan, when pulses of short duration are applied to voice frequency communication paths, they cause transients to appear in the paths at the receiving end, which transients are usually of a decaying or damped oscillating nature and persist for appreciable intervals of time after the applied pulses have terminated. In other words, the application of short pulses to some voice frequency transmission paths having had a low frequency cut-off, which pulses have fundamental and other frequency components suitable for transmission over the voice frequency communication path, are considerably lengthened by the transmission path and related equipment. Thus, if a pulse of a single cycle having a wave form approximating a sine wave and having a duration of approximately a millisecond is applied to such a voice frequency path, an alternating current of decreasing amplitude will be received at the receiving terminal for 3½ to 4 milliseconds. In order to prevent these alternating currents from interfering with the subsequent pulse, subsequent pulses are not transmitted closer together than approximately 4 milliseconds. That is, the beginning of one pulse is greater than approximately 4 milliseconds after the beginning of the preceding pulse. At the receiving terminal, pulses are not recognized any closer than about 4 milliseconds apart.

As set forth in the above-identified application of Vaughan, at the reception of a start pulse, which is the first pulse of any digit of a call designation, a multivibrator or other source of alternating current or pulses is turned or or set into operation and then the number of oscillations or pulses counted until the stop pulse is received.

In accordance with a feature of the present invention, equipment is provided for counting the pulses from the oscillator during the time the transient associated with any pulse is being dissipated. Thereafter, the output of the oscillator is switched to a register which comprises another counter so that this counter will count only the pulses designating the actual magnitude of the digit represented by the associated start and stop pulses.

Another feature of the present invention relates to circuits and equipment for counting all of the pulses of a complete subscriber station designation. If the proper number of pulses are received, the equipment stores the magnitude represented by the pulses. If, on the other hand, either a greater or lesser number of pulses than is required to properly designate the desired station are received, the receiving equipment is reconditioned or recycled so that it will respond to the next series of pulses designating the subscriber station. Thus, improperly received pulses are not employed and, consequently, do not cause wrong numbers.

Another feature of this invention relates to circuits and apparatus and methods of operation for picking out or selecting the desired digital positions of the subscriber's designation to control the switching circuits and apparatus at any switching position or station.

Another feature of this invention relates to equipment for checking the number of subscribers' designations received to determine whether they have been correctly received.

A feature of this invention relates to methods or circuits and apparatus for reconditioning the receiver under either of two conditions:

(1) An improper number of pulses have been received designating a calling station;

(2) Completion of the reception of a station designation and the storing thereof.

Another feature of this invention is directed to circuits, apparatus and methods of rapidly resetting counter and switching circuits between station designations comprising apparatus for generating short pulses including a short-circuited inductance connected in a power supply, means to remove the short circuit and a resistance shunt connected around the inductance to control the wave form and duration of the pulse.

The foregoing and other objects and features of this invention, the novel features of which are pointed out in claims appended thereto, may be more readily understood from the following description of an exemplary embodiment when read with reference to the attached drawings in which:

Fig. 1 shows in outline form various elements of an exemplary system and the manner in which they cooperate one with another;

Fig. 2 shows the manner in which Figs. 3 through 11 are arranged adjacent one another;

Figure 12:
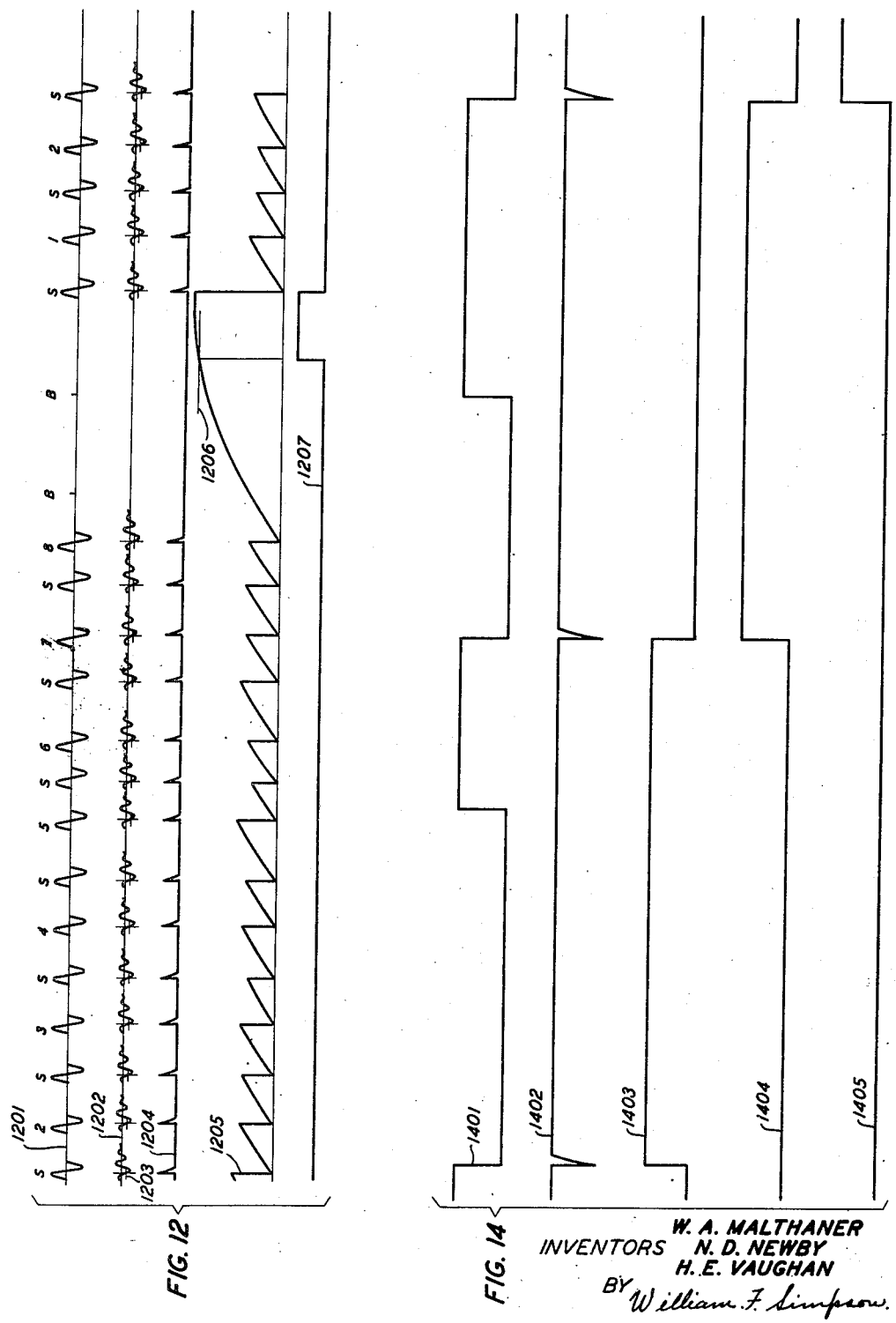
Figure 13:
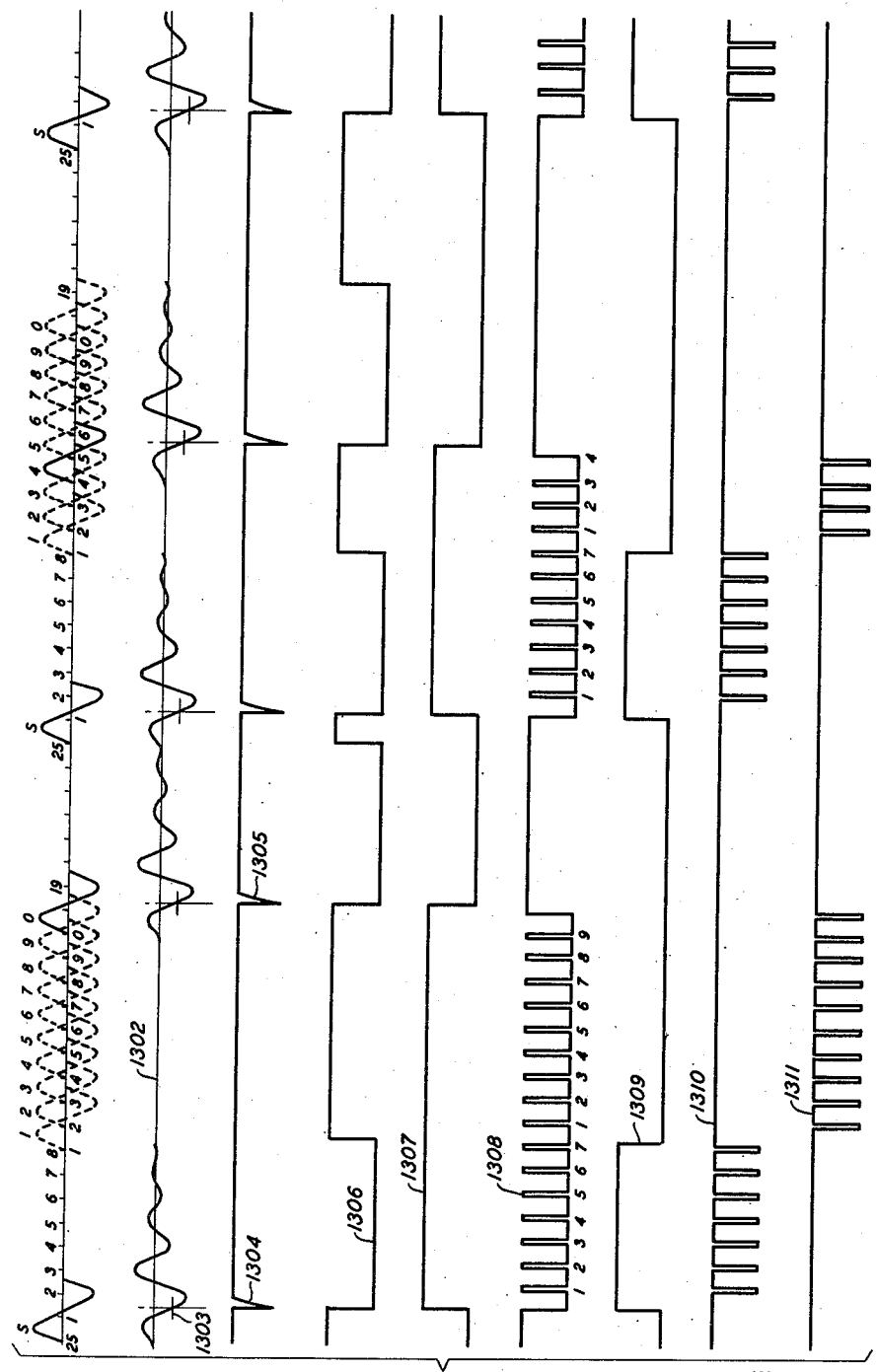

Figs. 3 through 11 when positioned as shown in Fig. 2 show in detail the various circuits of an exemplary embodiment of the invention; and Figs. 12, 13 and 14 show graphs of the potential or currents at various points in the system.

The exemplary embodiment, set forth hereinafter, is arranged to cooperate with pulse transmitting equipment such as disclosed in the above-identified application of Parkinson which disclosure is hereby made a part of this application by reference to the same extent as if said Parkinson application was set forth herein in full.

The receiver set forth herein in the following description of an exemplary embodiment is arranged to form a part of a complete telephone system of the type disclosed in Malthaner, Serial No. 35,925, filed on June 29, 1948, the same date herewith which issued as United States Patent 2,620,399 on December 2, 1952. The disclosure of the above-identified Malthaner application is also made a part thereof by reference to the same extent as if the disclosure of said application was set forth in full herein.

The receiver described herein is arranged to receive pulses representing the designation of the called subscriber's station and store the portions thereof necessary to extend the communication path through its switching center toward the station or ultimate destination of the call under control of the designating code. The usual telephone switching systems of subscribers' stations are designated by a multielement designation which usually takes the form of a multi-digit number. Frequently the designation includes one or more letters of the alphabet preceding a number and in the case of party lines another letter following the number designating a particular station on a party line.

In accordance with the present system the magnitude of each of the digits of a number is represented by the time elapsing between a start pulse and a stop pulse representing that digit. The various pulses representing all the digits or digital positions of a number, which in the exemplary embodiment set forth herein is eight, are separated by pauses or long blank intervals in transmission in order that the pulses representing each complete number may be readily recognized.

Furthermore, the pulses as transmitted are of short duration and have a fundamental and other frequency components within the voice frequency transmission range so that they may be readily transmitted over voice frequency transmission paths and through the usual type of transmision equipment forming part of such paths. Voice frequency transmission paths are usually of limited or narrow frequency range; for example say 300 to 2500 cycles. In transmitting pulses over such paths, it is desirable to select a pulse length having a fundamental frequency component near the midband frequency or near the mean frequency of the pass band. In transmitting pulses of short duration over voice frequency communication paths usually employed in telephone systems, transients are frequently set up which have the effect of lengthening the pulse at the receiver. These transients are usually in the form of decaying or damped oscillatory waves. For example, in the exemplary system set forth herein pulses having a wave form approximating a single cycle of a sine wave having a duration of approximately a thousandth of a second are applied by the transmitting equipment to the channel extending to the switching station. These pulses arrive at the switching station as a prolonged damped oscillatory wave which persists for approximately 3½ milliseconds.

In order to prevent interference between succeeding pulses, succeeding pulses are not transmitted until after the transient incident to a preceding pulse has been dissipated. In order to allow ample margin in the exemplary embodiment set forth herein the beginning of any two pulses must be at least four milliseconds apart. In other words, a start or reference pulse is transmitted and then no transmission take place for four millieconds. Thereafter, a stop or digit pulse is transmitted. This stop or digit pulse may be transmitted in any one of ten different time intervals of a half a millisecond separation. Following the transmission of the stop or digit pulse no further pulse may be transmitted for approximately another four milliseconds. In other words, if the digit interval is measured in increments of approximately a half millisecond, twenty-five such increments are required for each digit. The maximum separation of a start and a stop pulse will then be seventeen increments of time. In order to clearly distinguish the pulses repersenting a complete number or subscriber's designation, it is necessary to separate the pulses representing each such complete designation by a longer interval of time than seventeen increments of one-half millisecond each. In the exemplary embodiment set forth herein this interval of time has been assumed to be of the order of 25 to 50 increments of time, in other words, equal to approximately 1 to 2 times the length of the interval assigned to each digital position of the number.

The signaling pulses as transmitted are illustrated in Fig. 12 by the curve or graph 1201. Here a group of start pulses designated S are shown equally spaced, one for each of the digits of the subscriber's number or designation. Between complete numbers, two intervals each approximately equal to the time assigned to one digit, designated B in Fig. 12, are blank and shown at the place where the start pulses would normally occur. However, in order to clearly indicate the beginning and ending of complete station designations these two intervals are left blank so that no start pulses or stop pulses are transmitted during these intervals. It is to be understood that while two digit intervals are left blank any suitable number or any desired length of blank interval may be employed so long as it can be distinguished from the intervals between the pulses or currents representing the digits of each complete station designation.

Each of the start pulses is followed by a stop pulse variably spaced in time from the start pulse. These stop pulses are designated in graph 1201 by Nos. 1 through 8. The time of occurrence or transmission of the stop pulse with reference to the corresponding start pulse represents the magnitude of each digit of the subscriber's number or the character of each of the symbols designation.

The graph 1202 illustrates a typical wave form of the pulses as received and applied to the detecting equipment at the central switching station. As indicated by the graph 1202, each of the transmitted pulses or signals is appreciably lengthened. As pointed out above, the pulses are sufficiently spaced in time so that each magnitude of the voltage or currents of received pulse dies down to substantially zero before a succeeding pulse is transmitted.

The first line of Fig. 13 shows the last five pulses of graph 1201 on an expanded time scale. Here again the start pulses are designated S. The first stop pulse is designated zero and the second stop pulse is designated 4, the numbers 0 and 4 in this case represent the magnitude of the respective pulses. In addition, the first graph of Fig. 13 shows the ten possible positions of the stop pulse. For the first stop pulse it is assumed that it is received in the zero or tenth position and is accordingly shown by solid line. The other possible positions 1 to 9 are shown dotted. Similarly, the pulse in the No. 4 position of the second digit is shown solid since it is assumed that this pulse represents the magnitude of 4. The other nine positions 1 through 3 and 5 through 0 are shown dotted. The graph 1302 again shows the wave form of the received pulses as applied to detecting equipment at the central station. Here again it should be noted that each of the received pulses has sufficient time to decay to substantially zero before its succeeding pulses or wave train is received.

The receiver set forth herein, in response to pulses of the type described above representing a subscriber's station designation, selects and stores pulses representing the magnitudes of the digits of the designation or number which are to be employed at the switching center in extending the communication path towards the station of destination of the call.

In order to set the system in operation relay 114 is operated either manually of automatically. However, for purposes of illustration, assume that relay 114 is operated by operation of key 167.

Relay 114 in operating removes the terminating resistor 110 from the incoming line 112 and connects the line to the terminating equipment 124 which comprises a band-pass filter 120 and volume limiting or regulating amplifiers and the pulse shaping equipment.

The incoming line 112 usually comes through switching equipment from any one of the large number of incoming lines or trunks. These lines or trunks are frequently provided with suitable types of terminating equipment of various kinds, depending upon the type of incoming line or trunk. The incoming line or trunk may comprise open wire lines, cable circuits, carrier trunk channels, radio channels or any other suitable type of voice frequency communication path or any combination of any such type of paths. Each of the paths may include various types of associated supervisory and regulating equipment which is necessary or desirable to the proper transmission of the signals over the path. By terminating the path in a terminating resistor prior to connection to the receiving equipment noise and stray currents are reduced within the path and prevented from interfering with the operation of the receiving equipment. Consequently, both the receiving path and receiving equipment will be in proper condition to be connected together upon the operation of relay 114. Inasmuch as receiving equipment may be connected to any one of the large number of incoming lines as described in greater detail in the above-identified application of Malthaner, it is advantageous to first transmit the signals through a volume limiting or gain controlled amplifier, as is described herein.

Relay 114 in operating also conditions the volume limiting equipment 122 so that it will operate to control the gain and thus the amplitude of the output from this amplifier. The operation of relay 114 also operates the message register 118 to register a call and interrupts the operating circuit to relay 116.

Relay 116 in releasing conditions a code detector 135 in the start circuit 134 for operation.

From the volume limiting amplifier 122 pulses are amplified by the amplifier 128 and then applied to the digit detector 130 and the code detector 135. At this time the digit detector 130 is blocked so that it does not respond to the pulses received through amplifier 128. The code detector 135, however, responds to these pulses and repeats them to the blank interval timer 136. Blank interval timer 136 is provided to recognize the long time or blank interval between the pulses representing each complete subscriber's designation or number. When no pulses are received for a period of time equal to the time assigned for between 1 and 2 digits of a number, the blank interval timer will respond and condition the digit detector 130 to respond to the subsequent pulses. Thereafter, the digit detector 130 will respond to the succeeding pulses which are the first pulses of a complete subscriber's station designation. The output of the blank interval timer is also applied to steering circuit 151 and conditions this circuit for further response to pulses as will be described hereinafter.

The first pulse received by the digit detector 130 causes the disabler 131 to again disable the digit detector 130 for a short interval of time of approximately 3½ to 4 milliseconds. Thus the digit detector responds to and repeats the first pulse or wave of current of a given polarity applied to it and thereafter is disabled until the transient which arises incident to the transmission of a pulse has been dissipated. During the time the digit detector is disabled, the system is substantially unaffected by noise and stray currents. Consequently, the operation in the presence of stray currents is improved.

Thereafter the digit detector 130 and disabler 131 operate in a similar manner on each of the succeeding pulses. In this way the transients of one pulse are prevented from interfering with a succeeding pulse.

The first pulse from the digit detector 130 is also applied to a switching circuit called a square wave generator designated 132. The square wave generator 132 connects or sets into operation an oscillator or other source of varying current. This source 133 is called the timing multivibrator in Fig. 1. The switching circuit 132 also controls another switching circuit 150 as will be described hereinafter.

The output of the timing multivibrator 133 is transmitted through an electronic switch 159 to a counter 158. Counter 158 is arranged to count seven pulses and then be restored to its original condition. The output of the oscillator 133 or other suitable pulse source is arranged to transmit currents or pulses at the rate of one for each increment of each time interval assigned to a digit. Thus during the increments assigned to a start pulse, seven pulses are transmitted by the timing multivibrator 133 during the remainder of the transient of the first start pulse. These pulses are counted by the seven counter 158 shown in Fig. 1. At the end of this time the switch controlling circuit 157 actuates the electronic switch 159 so that the succeeding pulses from the source 133 are transmitted through the electronic switch 159 and through the digit steering circuit 151 and then to the proper digit counter 153. Thereafter, the number of pulses transmitted from the timing multivibrator 133 to counter A is in accordance with the magnitude of the first digit of the number. Counter A designated 153 in Fig. 1 thus counts these pulses so that the magnitude of the first digit may be recorded. If the magnitude of the first digit is one, the stop or digit pulse will be received over line 112 during the next pulse interval after the end of the count of 7 by the seven counter 158 so that only one pulse will be transmitted to and counted by counter 153. If the digit has a magnitude of say five then counter 153 will count five pulses before the stop or digit pulse is received over line 112. Upon the receipt of the digit or stop pulse over line 112 the digit detector 130 will respond to this pulse in the manner described above and cause the switching circuit or square wave generator 132 to be actuated which in turn stops or disconnects the source of current 133 and prevents any further pulses being generated or transmitted by this device.

Upon the reception of the next start pulse the circuits in converter 126 operate in substantially the same manner as described above. In this case the start pulse is repeated by the digit detector 130 which is thereupon disabled for the desired interval of time. The output of the digit detector 130 again actuates the switching or square wave generator 132. This generator again connects or activates source 133. In addition, the switching circuit 132 causes the steering stepping circuit 150 to be advanced one step so that the succeeding pulses will be counted and recorded by the counter 154 of binary counter 152. Here again the first seven pulses are counted by the seven counter 158 and each succeeding pulse is then transmitted through the steering circuit 151 to the B register designated 154 in Fig. 1. In a similar manner, pulses representing each of the succeeding digits desired may be counted by counters similar to 153, 154 and 155, inclusive as shown in Fig. 1.

When desired or necessary the steering circuit 151 may be arranged to direct or steer the pulses representing all digital positions of a subscriber's designation to respective counting and storing circuits. Thus, in the case of an eight digital position designation, the steering circuit will direct or distribute pulses representing the magnitude in the digit in each of the digital positions of the proper one of the eight counting and storing circuits.

Three digital counters 153, 154 and 155 are shown in the drawing. These are shown merely by way of example to show the position of the counting and storing circuits in the system and the manner in which they cooperate with the other circuits of the system. These counters represent any suitable or necessary number of counting circuits from one to a maximum number of digital positions in a complete subscriber's designation. When, as in the usual case, it is only necessary to use a portion of the digital positions of a subscriber's designation at any one switching center the counting circuits 153, 154 and 155 represent that portion which it is necessary or desirable to use at any one switching center. This portion may comprise the first one or more digital positions, one or more intermediate digital positions or one or more of the final digital positions of the subscriber's station designation. Also the counters as shown in the drawing may be employed to count and store pulses representing the magnitude of the digits in either consecutive or non-consecutive digital positions of the complete subscriber's designation.

The output from the digit detector 130 is also applied to sixteen pulse counter 147. The sixteen pulse counter 147 is employed to count each of the output pulses from the digit detector 130. In the exemplary embodiment set forth herein there should be exactly sixteen pulses representing each subscriber's designation because two pulses are required to represent each digit or digital position of the subscriber's identifying code and eight such digits are employed in each subscriber's designation. In other words, there should be sixteen pulses received between each of the blank intervals between the pulses representing a complete number or subscriber's designation.

If at the time the second blank interval is recognized by the blank interval timer 136, sixteen pulses have been received, the locking circuit 142 is set into operation and in turn causes the operation of the relay 175 through the cathode follower circuit 144. The relay 175 in operating completes an obvious circuit for the operation of relay 174 and interrupts the operating circuit of relay 114 and also causes the setting of the binary counters 153 through 155 to be stored in the storing circuits 169 through 163. Thereafter when desired, the number registered or stored in the storing circuits may be checked by checking relays 164 and the appropriate correct or error registers 166 and 165, respectively, operated.

The operation of relay 175 removes the short circuit from around the inductance 170 thus inserting this inductance in the battery supply lead extending to the sixteen pulse counter 147 and the switching or square wave generator 122 and possible other circuits. The insertion of this inductance causes the current to be momentarily reduced to a very low value similar to interrupting the circuit for a controlled short interval and thus in effect causes a negative pulse to be applied to the battery supply lead extending to the above-mentioned circuits. This pulse has the effect of restoring these circuits to their initial condition wherein they are ready to respond to more received pulses.

The operation of either of the registers 165 or 166, assuming the keys 167 and 168 in the set are as shown, completes a circuit for the operation of relay 176 which relay in turn causes the operation of relay 177. Relay 177 interrupts the short circuit around inductance 171 in the battery supply lead of the binary counter circuit 152 as well as circuit 148 and the locking circuit 142 thus causing all of these circuits to return to their initial condition.

If either a greater or lesser number of pulses than sixteen is received between the two blank intervals or if the receiving circuits respond in such a manner that more or less than sixteen pulses are transmitted to the sixteen-pulse counter 147 between two blank intervals as recognized by the blank interval timer 136 the entire receiving equipment will be recycled upon reception of the second blank interval. If circuit 136 responds to a second blank interval at a time when the sixteen-pulse counter 147 does not indicate a count of sixteen the recycle circuit 143 is controlled by the counterreader 148 and causes the recycle relays 173 and 172 to be operated through the cathode follower circuit 145. Operation of the recycle relay 172 causes a recycle register 169 to operate. As shown in Fig. 1 a subsidiary locking circuit is provided for relay 172 under control of the recycle register 169 which insures that the register will completely operate each time the relay 172 operates.

Relay 173 in operating removes the short circuit from around both the inductances 170 and 171 and thus resets all of the above-mentioned circuits without causing the setting of the digit counters 153, 154 and 155 to be transferred to the digit storing circuits 161, 162 or 163. Thereafter the receiving circuit operates as described above in response to the succeeding series of pulses representing a called subscriber's station or designation. If sixteen pulses are received by the sixteen-pulse counter for this series of pulses the setting on the digit counters will be transferred to the digit registers or storing devices as described above. If on the other hand a different number of pulses is counted by the sixteen-pulse counter the circuits will be recycled again as described above.

The manner in which the above-described circuits function may be more readily understood from the following description when read with reference to Figs. 3 to 11 as arranged adjacent to one another in a manner shown in Fig. 2.

Reference will also be made to Figs. 12, 13 and 14.

Fig. 3 shows the limiter circuit designated 124 in Fig. 1. In addition, Fig. 3 illustrates in a general way the manner in which the subscriber station is connected to the input circuit of the receiving equipment. The subscriber station is indicated at 310 as being connected over a line 312 to a central switching station having terminal and switching equipment 313. The subscriber's station may be in accordance with the disclosures of the above-identified patent application of Parkinson or in accordance with the disclosure of the above-identified patent application of Malthaner or in other suitable subscriber's station equipment.

Line 312 may comprise any suitable type of subscriber's line providing a voice frequency transmission path of from approximately 75 cycles to 1950 cycles, or higher. The usual subscriber's line provides a voice frequency transmission path having greater frequency range.

The terminal and switching equipment 313 may comprise any suitable type of line terminating equipment at a central switching station as well as any suitable type of switching equipment. The switching equipment shown in the above-identified patent application to Malthaner which in turn shows equipment of the type disclosed in Bruce et al. Serial No. 782,702, filed October 29, 1947. This equipment may also include other types of switching equipment such as so-called panel type systems or crossbar systems when so desired. The receiver equipment described herein in detail will cooperate equally well with all of these various switching systems as will be readily understood from the following description.

The incoming line, after passing through the terminal and switching equipment 313, is normally terminated by resistor 1063 connected to the break contacts of the relay 1062.

The gain of the limiting amplifier shown in Fig. 3 is normally maintained at its maximum value due to a circuit extending from ground through the inner upper break contacts of relay 1062 and resistor 327 to the center point of the input transformer secondary 315 as well as the connections through the condenser and resistance network 326 and the voltage dividing network 329.

When it is desired to condition the receiver for receiving pulses relay 1062 is operated by the operation of the key contacts 1114 or 1115 or automatically under control of switching circuits as set forth in the above-mentioned application of Malthaner.

The operation of relay 1062 at this time removes the terminating resistance 1063 from the incoming line and connects the line to the bandpass filter 320. Thereafter incoming signals from the terminal equipment 313 are transmitted through the filter equipment 320 to the terminating resistance 314 and the input transformer 315. The terminating filter 320 may be of any suitable type and is provided to prevent power supply frequencies, which may be supplied over the line 312 to operate the equipment at the subscriber's station, from interfering with the operation of the receiving equipment of the exemplary embodiment set forth herein in detail. In addition, the filter equipment 320 is used to shape the pulses so that pulses arriving over different subscriber's lines will all have similar shapes so that the receiving equipment will respond to the received pulses substantially the same and independent of the subscriber's line over which they arrive. Filter 320 also prevents extraneous noise and high frequency currents from interfering with operation of the receiving equipment.

Transformer 315 is a push-pull input transformer and applies the incoming pulses to the control grids of tubes 316 and 317 in phase opposition. Tubes 316 and 317 comprise a push-pull amplifier and repeat the incoming pulses through the output transformer 318 to the terminating resistor 340 and the conductors 341 extending to Fig. 4. The input winding of transformer 319 is also connected across the terminating resistor 340 and repeats the signal output from the push-pull amplifier comprising tubes 316 and 317 to the grid circuit of tube 321.

The grid of tube 321 is normally biased by voltage divider 330 so that substantially no current flows in the anode-cathode circuit of this tube unless positive pulses are applied to the grid from transformer 319. So long as the amplitude of the pulses applied to the transformer 319 from the output of tubes 316 and 317 is below a predetermined minimum value the gain of tubes 316 and 317 is maintained at a maximum value due to the grid potential supplied to the center point of the secondary winding of transformer 316. However, when the amplitude of the pulse output from this amplifier as applied to the transformer 319 to the grid of tube 321 exceeds the predetermined minimum value as determined by the voltage divider 330 positive pulses will be applied to the control grid of tube 321 thus causing current to flow in the output circuit of this tube.

When current flows in the output circuit of tube 321 the anode potential of this tube will be reduced and in turn reduce the input voltage applied to the grid of tube 322. Tube 322 acts as a cathode follower tube and tends to repeat the potential applied to its grid in its cathode circuit. Thus, when the grid becomes negative as described above the cathode of tube 322 also becomes more negative than previously. The cathode of this tube is coupled to the rectifier tube 325 through the coupling condenser 324. Coupling condenser 324 and related resistors have a long time constant so that the potential applied to the cathode of rectifier 325 follows the potential of the cathode of tube 322 with the desired accuracy. The application of a negative pulse or potential to the cathode of the rectifier tube 325 causes current to flow through tube 325 which in turn tends to discharge the upper terminal of 326 so that this terminal becomes more negative thus decreasing the bias voltage applied to the control grids of tubes 316 and 317 thus reducing the gain of these tubes.

The time constant of networks 326 as well as the other circuit elements are such that it requires several pulses to properly control potential of the control grids of tubes 316 and 317 and thus to control the gain of the amplifier tubes 316 and 317. At the end of several pulses the gain of the amplifier will become constant and will be of such a value that the output pulses will have substantially the same magnitude independently of the magnitude of the received pulses and thus independent of the length of line, transmission characteristics and the line of the incoming subscriber's line.

The operation of relay 1062 also completes an obvious circuit for the operation of the register 1064 which counts or records the total number of calls handled by the receiving equipment described herein. The operation of relay 1062 also connects the short circuit around the inductance coils 1054 and 1053. This short circuit, however, does not materially affect the current flowing in these leads thus does not materially affect the operation of the system because the resistance in these coils is relatively low and a relatively insignificant part of the resistance of the load circuits supplied through the inductances 1053 and 1054.

The operation of relay 1062 also interrupts the circuit of the normally operated relay 1061 this permitting relay 1061 to release. Release of relay 1061 at this time partially conditions other circuits which will be described hereinafter and, in addition, provides a locking circuit for maintaining relay 1062 operated under control of relay 1070.

Figure 4:
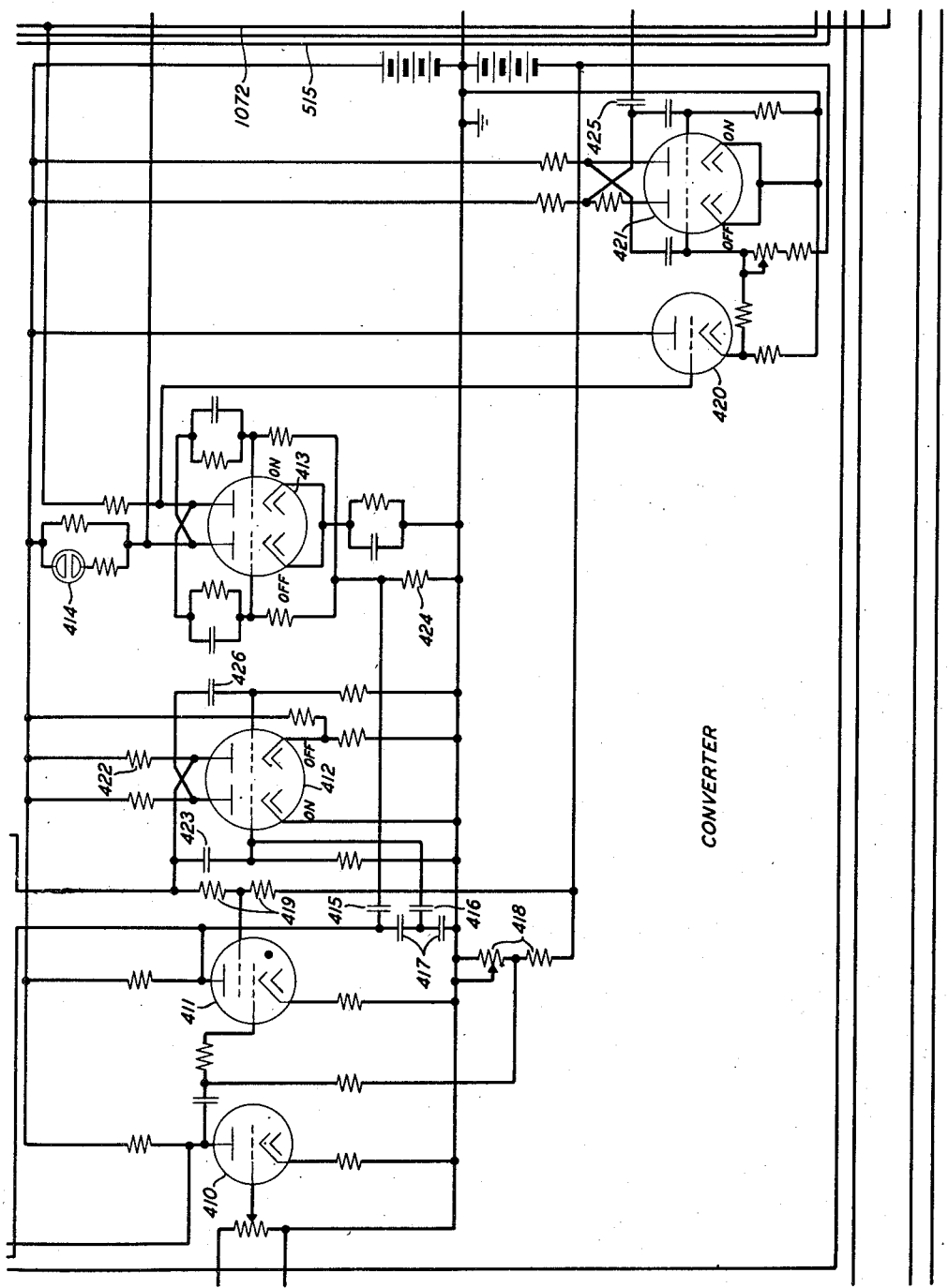
Figure 5:
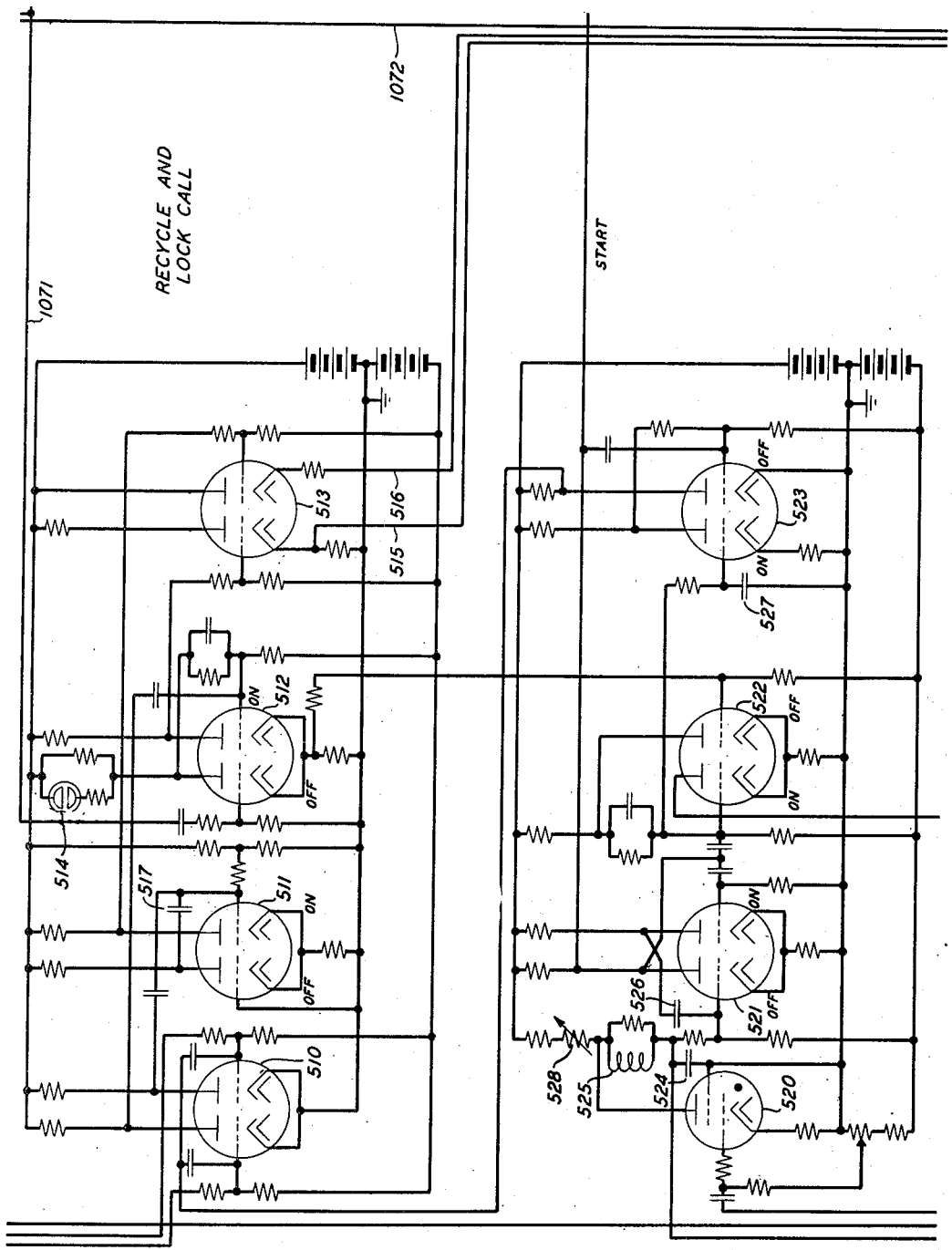

Relay 1061, in releasing, also removes ground from the upper terminal of condenser 524 of the start circuit shown in the lower portion of Fig. 5 and designated 134 of Fig. 1 thus conditioning this circuit so that it will respond to the received pulses. The start circuit shown in the lower portion of Fig. 5 is arranged to recognize the blank intervals, that is, the pauses between each series of pulses representing a complete subscriber's station designation or number.

The polarity of the output from the output transformer 318 as applied to conductors 341 is shown by the graph 1320. These pulses or currents are applied to the grid of tube 410 and after repeating and amplification by tube 410 they appear as positive pulses or of opposite polarity at the anode of tube 410. These pulses are then applied through two coupling networks to one of the grids of each of the tubes 411 and 520. Tubes 411 and 520 are gaseous discharge tubes and are arranged so that they are normally not conducting. Tube 411 has biases applied to both of the control grids so that under normal conditions and except as will be described more fully hereinafter the application of positive pulses to the first grid of tube 411 will not create a discharge through the tube.

Tube 520, however, has its second grid connected to ground potential and thus this grid is only a few volts negative with respect to the cathode. As a result the application of each positive pulse to the control grid of tube 520, which exceeds a predetermined magnitude, causes a discharge through this tube providing sufficient anode potential is supplied to the tube. As described above, the release of relay 1061 removed ground potential from the anode of tube 520. Thereafter, tube 520 will respond to the positive portions of each of the pulses applied to its control grid and in turn causes negative potential to be applied to its anode due to the anode resistor of this tube. Between the application of positive pulses to the control grid of tube 520, the upper terminal of condenser 524 will start to charge to a positive potential through the anode resistors of tube 520 and the inductance 525 and its shunt resistor.

Normally, the right-hand section of tube 521 and the left-hand sections of tubes 522 and 523 are conducting while the other section of each of these tubes is not conducting. Similarly, the left-hand section of tube 412 and the right-hand section of tube 413 is likewise conducting current while the opposite sections are not.

Upon the application of the positive portions of each received pulse to the control grid of 520 after the release of relay 1061, a discharge is initiated through the gaseous conduction tube 520. This discharge causes condenser 524 to be discharged. The condenser 524 together with the inductance of 525 and its associated shunting resistance are so related one to another and to the tubes and voltages applied to the circuit that the upper terminal of condenser 524 will be sufficiently discharged each time tube 520 becomes conducting that the discharge through tube 520 is extinguished. In other words, these elements form an oscillating circuit but current will flow for a portion only of one cycle of the oscillation for each discharge through tube 520 and then extinguish the tube. The resistance shunting the inductance 525 is provided to rapidly damp out the oscillation in the circuit comprising inductance 525 and condenser 524 so that substantially only a fraction of a cycle flows in the output circuit for each discharge through the tube.

The above-described operation is repeated for each received pulse until the silent interval or pause between pulses representing each complete subscriber station designation. At this time no pulses will be received for a sufficiently long interval of time so the upper terminal of condenser 524 will receive a sufficiently high positive potential to initiate a discharge of current through the left-hand section of tube 521.

The above described operation in the start circuit is illustrated in Fig. 12. When the amplitude of the received pulses or current from the volume limiting amplifier of Fig. 3 crosses the bias line designed 1203, the amplified currents from tube 410 will be of sufficient magnitude to initiate a discharge through tube 520. Each discharge through tube 520 causes current to flow through the tube, discharging the upper terminal of condenser 524. The graph 1204 of Fig. 12 represents the current flowing through tube 520.

Graph 1205 illustrates the voltage of the upper terminal of condenser 524. As shown by the graph 1205 the voltage of the upper terminal condenser 524 falls to a relatively low and fixed value upon each discharge through tube 520. Each discharge through tube 520 is terminated by the action of the gas conduction tube, inductance 525, and condenser 524. At this time the upper terminal of condenser 524 starts to charge through resistor 528 and thus its voltage rises. The time during which this voltage is permitted to rise determines the magnitude of the voltage. The charging action and discharging action in the circuits is illustrated by the irregular sawtooth curve 1205, Fig. 12. Each one of the teeth are of intermediate amplitude until after the reception of the eighth stop pulse as shown in Fig. 12. After this pulse is received no further pulses will be received for the two blank intervals with the result the upper terminal of condenser of 524 will charge for a longer interval of time and reach an appreciably higher voltage. When the voltage of the upper terminal of condenser 524 exceeds a reference voltage indicated by line 1206, Fig. 12, current is initiated through the left-hand section of tube 521 which current continues until the first start pulse representing the next complete subscriber's number is received. At this time a discharge is again initiated through tube 520 which in turn discharges the upper terminal of condenser 524 and interrupts the current through the left-hand section of tube 521. The graph 1207 represents the current flowing through the left-hand section of tube 521.

When current starts to flow through the left-hand section of tube 521, the anode potential of this section will fall and apply a negative potential through the coupling condensers to the control grids of the right-hand section of tube 521 and the left-hand section of tube 522.

The negative potential or pulse from the anode of the left-hand section of tube 521, when this section starts to conduct current, is also applied to the control grid of the left-hand section of tube 523. However, condenser 527 connected between the control grid and the cathode or ground of this tube provides a pulse lengthening means so that the response of this tube at this time is retarded a short interval of time.

The negative pulse output from the left-hand side of tube 521 is also coupled to the grid of the right-hand section of tube 523. However, this section of tube 523 is normally biased so that the tube will not repeat the pulse applied to its grid at this time. After the termination of the pulse as applied to the grid of the right-hand section of tube 523 as determined by the constants of the coupling circuit, the left-hand section will respond to the lengthened pulse due to condenser 527 which interrupts the current flowing through the left-hand section of this tube. When the current flowing through the left-hand section of tube 523 falls, the voltage drop across the anode resistor also decreases so that the anode potential rises and applies a more positive bias to the control grid of the right-hand section of this tube so that upon the application of the next negative pulse from the left-hand section of tube 521 the right-hand section of tube 523 will operate as an amplifier and repeat a positive pulse in its output circuit as will be described hereinafter.

When a current flowing through a left-hand section of tube 522 is interrupted, the potential drop across the cathode resistor common to both sections of this tube falls to a low value which in effect makes the potential difference between the cathode and the control grid of the right-hand section more positive so that current will start to flow through the right-hand section of tube 522. Current flowing through this section causes the potential of the anode of this section to fall in value which in turn applies a sufficiently negative grid potential to the left-hand sections of tubes 522 and 523 to maintain these sections non-conducting unitl some further potential is applied to the system to alter their conducting conditions as described hereinafter.

When the left-hand section of tube 521 becomes conducting during the blank interval as described above, a negative pulse of short duration is applied through the coupling condenser 722 to the control grid of the right-hand section of tube 716. This tube is normally conducting so that the application of a negative pulse to its control grid causes a positive pulse to be repeated in the output circuit of the right-hand section of tube 716. The output circuit of the right-hand section of tube 716 is connected through the coupling condenser 723 to the control grid of the gaseous conduction tube 715. The application of positive pulse to the control grid of tube 715 at this time initiates a discharge through tube 715. The discharge flowing through tube 715 will thereafter continue until interrupted as described hereinafter. If a discharge had been flowing through tube 714 prior to the initiation of a discharge through tube 715 the initiation of the discharge through tube 715 will momentarily raise the potential of the cathode of tube 714 above the potential of its anode and thus interrupt the discharge flowing through tube 714. The discharge flowing through tube 715 causes its cathode to rise in potential and condition tube 711 to have a discharge initiated through it upon the reception of the first start pulse of the succeeding pulses designating a called subscriber's station as will be described hereinafter.

Upon the application of the first pulse following the blank interval between the pulses representing a complete subscriber's station designation, a discharge is again initiated through tube 520 whereupon the upper terminal of condenser 524 is again discharged and a negative potential applied to the control grid of the left-hand section of tube 521, thus interrupting the current through this tube and causing current to be initiated through the right-hand section. Thereafter, the circuits respond as described above to each succeeding pulse applied to the control grid of tube 520 which therefore maintains the upper terminal of condenser 524 effectively discharged so that the left-hand section of tube 521 remains non-conducting and the right-hand section conducting. Likewise the right-hand section of tube 522 remains conducting and holds the left-hand sections of tubes 522 and 523 non-conducting.

When current ceases to flow through the left-hand section of tube 522 during the blank interval as described above, the potential drop across the resistor 422 common to the anode circuits of the left-hand section of tube 522 and the right-hand section of tube 412 is greatly decreased thereby raising the potential applied to the upper terminal of the upper resistor 419. As a result a more positive bias is applied to the second grid of tube 411 so that upon the application of the succeeding positive pulses to the control grid of tube 411, from the output of the tube 410, discharges will be initiated through tube 411.

The first pulse following a blank interval will be the start pulse of the first digit or first digital position of the called subscriber's number or designation. This pulse may represent either a numeral or a character of the alphabet or some other symbol as may be desired. Upon the initiation of a discharge through tube 411 in response to this pulse, current flows in the output circuit of tube 411 thus lowering the anode potential and applying a negative pulse through the coupling condensers 415 and 416 to the circuits of tubes 413 and 412. The output circuit of tube 411 also includes condenser 417 which together with the anode resistor form an oscillating circuit for extinguishing the discharge through tube 411 when condenser 417 becomes sufficiently discharged.

The application of a negative pulse to the control grid of the left-hand section of tube 412 through the coupling condenser 416 interrupts a current flowing through the left-hand section of tube 412. The magnitude of the coupling condenser 416 and the biasing resistor associated with the grid of the left-hand section of tube 412 are chosen to apply a pulse of very short duration to the control grid of the left-hand section of tube 412 in response to each discharge through tube 411. Such circuits are sometimes called differentiating circuits.

Upon the interruption of current flowing through the left-hand section of tube 412, its anode potential rises and applies a positive potential or pulse through the coupling condenser 426 to the control grid of the right-hand section of this tube whereupon current starts to flow through the right-hand section of tube 412 which in turn decreases its anode potential so that a negative pulse is applied through the coupling condenser 423 to the control grid of the left-hand section of tube 412 and thus tends to maintain the left-hand section of this tube non-conducting.

As described above, when current starts to flow through the right-hand section of tube 412 its anode potential falls to a relatively low value and in addition to applying a negative pulse of potential to the coupling condenser 423 to the control grid of the left-hand section 412, it also reduces the potential applied to the upper terminal of the upper resistance 419, thus reduces the bias applied to the second grid of tube 411. Thus during the time the right-hand section of tube 412 is conducting, the potential of the second grid of tube 411 is reduced to a sufficiently low value so that the application of positive pulses to the first grid of tube 411 is incapable of creating a discharge through tube 411.

The time-constants of the circuits involving condenser 423 are selected so that the right-hand section of tube 412 remains conducting for approximately 3½ to 4 milliseconds.

After the termination of the pulse applied to the coupling condensers 416 and 423, the potential applied to the control grid of the left-hand section of tube 412 will rise and after a time delay of about 3½ milliseconds will rise to a sufficiently positive potential to cause current to be initiated through the left-hand section of this tube which in turn interrupts the current flowing through the right-hand section of tube 412.

Thus only a single discharge is created through tube 411 in response to each pulse transmitted from the subscriber station. Tube 411 is thus prevented from having a discharge initiated through it in response to each of the positive half cycles of the prolonged pulse or transient current received at the switching center.

The response of tube 411 to the first start pulse of a subscriber's station designation causes a negative pulse to be applied to the grids of both sections of tube 413 through the coupling condenser 415. The coupling condenser 415 and resistor 424 have a short time constant so that they cause a pulse of short duration to be applied to the grids of both sections of tube 413.

Both sections of tube 413 are connected in a double stability circuit such that either section may be conducting and continue conducting until a negative pulse is applied. Furthermore, the right-hand section is normally conducting at the time a start pulse is applied to the control grids of both sections. The manner in which the right-hand section is rendered conducting at this time will be described hereinafter.

Upon the application of a negative pulse to both grids the current flowing through the right-hand section is interrupted and current is initiated through the left-hand section. Current flowing through the left-hand section causes the neon lamp 414 to be lighted, thus indicating that the left-hand section is conducting. The initiation of current through the left-hand section of tube 413 causes the voltage of its anode to fall to a relatively low value and thus applies a negative pulse through the coupling condenser 821 to the control grid of the right-hand section of tube 811.

Here again the coupling condenser 821 and resistor 822 have a short time constant so that they in effect differentiate the potential of the anode of the left-hand section of tube 413 and cause the application of a very short negative pulse to the grid of the right-hand section of tube 811. Tube 811 as well as tubes 812, 813 and 814 are all connected in double stability counting circuits with right-hand section normally conducting current. The application of a negative pulse to the control grid of the right-hand section of 811 at this time interrupts a current flowing through the right-hand section of this tube which in turn initiates current through the left-hand section with the result that the voltage of the anode of the right-hand section rises to nearly positive battery potential while the voltage of the anode of the left-hand section falls to a relatively low value. These anode voltages control bias potentials applied to the grids of the corresponding sections of tube 810. Thus upon the application of the negative pulse of the control grid of the right-hand section of tube 811 in response to the first start pulse, the bias supplied to the control grid of the right-hand section of tube 810 is raised so that thereafter the right-hand section of tube 810 will function as an amplifying and repeating tube and repeat positive pulses of current applied to it. In addition, the bias applied to the left-hand section of tube 810 is decreased with the result that left-hand section is blocked and rendered incapable of repeating any pulses applied to it.

When the left-hand section of tube 413 becomes conducting in response to the application of the first start pulse of a subscriber's designation as described above, a negative pulse is also applied through the coupling condenser 718 to the control grid of tube 710. Coupling condenser 718 and bias resistor 719 have a short time constant so that they tend to shorten the negative pulse supplied to the control grid of this tube. The application of a negative pulse to the control grid of tube 710 causes a positive pulse to be repeated in the output circuit of this tube in a well understood manner. This positive pulse is applied to the control grids of tubes 711, 712, 713 and 714.

In the exemplary embodiment set forth herein in detail it has been assumed that it is necessary or desirable to determine the magnitude of the digits of the first three digital positions of the called subscriber's number. Consequently, only four tubes 711, 712, 713 and 714 have been shown. If the magnitude of more or other digits must be determined, additional tubes similar to tubes 711, 712, 713 and 714 will be provided.

Tubes 711, 712, 713 and 714 are gaseous conducting tubes wherein a discharge continues to flow after it has been initiated until interrupted by some means or potentials applied to the tubes. Control biases applied to these tubes are such that the positive pulse repeated through the output circuit of tube 10 is insufficient to initiate a discharge through these tubes. However, as described above, a discharge is flowing through tube 715 with the result that its cathode will be at a higher positive potential than the cathodes of tubes 711, 712, 713 and 714. The cathode of tube 715 is coupled through resistor 720 to the control grid of tube 711 with the result that the grid bias supplied to tube 711 at this time is higher than the bias supplied to the other tubes 712, 713 and 714. Consequently, when a positive pulse is repeated in the output circuit of tube 710 as described above, the bias of tube 711 is sufficiently high so that a discharge will be initiated through this tube but not through the other tubes 712, 713 and 714. Initiation of a discharge through tube 711 causes the potential of its cathode to rise to a relatively high positive value and due to the action of condenser 721 causes the discharge through tube 715 to be interrupted. The action of condenser 721 at this time is well understood. Briefly, condenser 721 causes the cathode of tube 715 to be momentarily raised above the potential of the anode circuit of this tube and thus extinguishes the discharge through the tube.

The initiation of a discharge through tube 711 continues until interrupted as herein described and applies the proper bias to the control grid of the left-hand section of tube 717 so that thereafter the left-hand section of tube 717 will operate as an amplifier tube and will repeat in its output circuit pulses as applied to its control grid. The other section of tube 717 as well as both sections of tube 716 are biased to cut-off or beyond so that they will not repeat at this time any of the pulses applied to their control grids.

When the current through the right-hand section of tube 413 is interrupted in response to the reception of the first start pulse following the blank interval its anode will rise to a relatively high positive potential or voltage and cause the grid of tube 420 coupled thereto to likewise rise to this potential. Tube 420 is connected to operate as a cathode follower with the result that its cathode also rises to a relatively high positive potential. Under these circumstances, the bias applied to the control grid of the left-hand section of tube 421 will rise so tube 421 will operate as a multivibrator at this time and cause pulses to be applied through the coupling condenser 425 and also condensers 823 and 824 to the grids of both sections of tube 810.

As described above, the right-hand section of tube 810 is conditioned to repeat the positive pulses from this multivibrator whereas the left hand section of this tube is blocked and thus incapable of repeating the pulses.

The time constants of the circuits of the multivibrator tube 421 are such that a complete cycle of operation requires approximately a half millisecond and thus substantially the time difference assigned to the adjacent stop pulse positions. The output pulses from the multivibrator 421 are applied to the control grids of both sections of tube 810 and then repeated through the right-hand section of tube 810 and applied to the control grids of both sections of tube 812 through the coupling condenser 815. Tube 812 has both of its sections wired in a double stability circuit with the right-hand section normally conducting and operates as a first stage of a binary counter. Tube 813 is similarly connected and operates as a second stage of a binary counter. Tube 814 operates as a third stage of a binary counter. The control grids of both sections of tube 813 are connected to the output of the right-hand section of tube 812 through the coupling condenser 816 and tube 814 is connected through the coupling condenser 817 to the output of the right-hand section of tube 813. Thus upon the application of the first negative pulse to the control grids of tube 812 the right-hand section of this tube ceases to conduct while a discharge is initiated through the left-hand section thereof. Upon the application of the second pulse, current is again initiated through the right-hand section and the current through the left-hand section interrupted. In addition, the current through the right-hand section of tube 813 is interrupted and current initiated through the left-hand section of this tube. Upon the application of the fourth pulse the current conditions in both tubes 812 and 813 are again restored to their normal condition. Current is also initiated through the left-hand section of tube 814 and the current through the right-hand section interrupted.

Upon the interruption of the current through the right-hand section of tube 814 the potential of its anode rises and applies a positive pulse to the control grid of the left-hand section of tube 818. Condenser 820 is connected between the control grid and the cathode of the left-hand section of tube 818 to lengthen the pulse applied to its control grid so that the control grid of this tube will still be sufficiently positive upon the termination of the negative pulse applied to the grids of both sections of tube 812 to again interrupt the current flowing through the right-hand section of tube 812 and initiate current flow through the left-hand section thereof. In other words, in response to the application of the fourth pulse to the binary counter shown in Fig. 8, the binary counter takes two steps. The fifth pulse causes tube 812 to be restored and tube 813 to be operated to its operated position. The sixth pulse causes tube 812 to be operated to its operated position and the seventh pulse causes all tubes 812, 813 and 814 to be restored to their normal condition. The current through the left-hand section of tube 814 is interrupted so that the potential of its anode rises to relatively positive potential and applies a positive pulse through the coupling condenser 825 to the control grid of the right-hand section of tube 818. Tube 818 repeats this as a negative pulse in its output circuit which is connected to the anode of the right-hand section of tube 811 and causes a negative potential to be applied to the control grid of the left-hand section of tube 811, which in turn interrupts the discharge through the left-hand section thereof. As a result the potential of the anode of the right-hand section falls to a relatively low value and blocks the right-hand section of tube 810 whereas the potential of the anode of the left-hand section of tube 811 rises to a relatively high positive potential and thereby applies the proper bias potential to the grid of the left-hand section of tube 810 so that thereafter the right-hand section of tube 810 will not repeat the pulses applied to its control grid but the left-hand section will repeat the positive pulses applied to its control grid into its cathode circuit and thus to the circuit shown in Fig. 7.

When the multivibrator circuit comprising tube 421 operates at a frequency or period, such that one complete cycle requires approximately a half a millisecond, the seven-counter, operation of which is described above with reference to Fig. 8, completes the count of seven at the end of the interval of time allowed for the start pulse. If the stop pulse should arrive immediately following, it is desired to record a count of one for the digit or register counter shown in Fig. 8. Each additional half millisecond thereafter which elapses before the stop pulse is received will register the next highest magnitude. It should also be noted that at the end of the count of seven the counter circuit shown in Fig. 8 as well as the switching tubes 811 and 810 are restored to their initial condition.

The next cycle of operation of the multivibrator tube 421, which will be the eighth cycle from the time the start pulse was received, will cause a pulse to be transmitted through the coupling condenser 425 to the grid of the left-hand section of tube 810. A similar pulse is generated in the cathode circuit of this tube and then applied through the left-hand section of tube 717 through coupling condenser 915 to both grids of tube 911. Both sections of tube 911 are connected in a double stability or flip-flop circuit with the right-hand section normally conducting and serves as one stage of the binary counter. Both sections of tubes 912, 913 and 914 are similarly connected. Tube 912 comprises a second stage of the counter, tube 913 the third stage and tube 914 the fourth stage. These tubes are arranged so that prior to the application of a pulse to the counter, the right-hand section of each of the tubes is conductive and the left-hand section non-conductive. Thereafter each succeeding pulse from multivibrator or other signal source, until the stop pulse arrives, is applied to the counter circuit shown in Fig. 9. Upon the reception of a stop pulse a discharge will again be initiated through tube 411 which discharge will again actuate the sections of tube 412 as described above and prevent a further discharge through tube 411 of approximately 3½ to 4 milliseconds. The second discharge through tube 411 also applies a second negative pulse to the grids of both sections of tube 413 through the coupling condenser 415. This negative pulse interrupts the current flowing through the left-hand section of tube 413 at this time and initiates current through the right-hand section. The interruption of the current through the left-hand section causes the anode of this section to rise to a more positive value and in turn applies a positive pulse to the control grids of tube 710 and the right-hand section of tube 811. These positive pulses are ineffective to further effect the operation of the circuit.

The initiation of current through the right-hand section of tube 413 lowers the anode potential of the right-hand section of this tube and consequently lowers the potential applied to the control element of tube 420. As a result the cathode of this tube also has its potential lowered and in turn applies a lower bias to the control grid of the left-hand section of tube 421. As a result, the operation of the multivibrator circuit comprising tube 421 is interrupted with the right-hand section of tube 421 conducting and the left-hand section non-conducting.

At this time, the number recorded by the counter 901 represents the magnitude of the first digit of the called subscriber's station designation or number or else it represents the first letter or symbol of the called subscriber's designation.

Upon reception of the second start pulse, which will be at least 4 milliseconds after the reception of the first stop pulse, another discharge will be initiated through tube 411 because tube 412 will have had sufficient time to be restored to its initial condition with the left-hand section conducting and the right-hand section non-conducting.

The initiation of a discharge through tube 411 at this time again applies a negative pulse to both grids of tube 413 whereupon the current through the right-hand section is interrupted and the current through the left-hand section again initiated. As a result the second negative pulse is applied to a control grid of the right-hand section of tube 811 and to the control grid of tube 710. Application of a second negative pulse to the control element of the right-hand section of tube 811 interrupts the current through this section and causes current to be initiated through the left-hand section of tube 811 with the result that the bias potential applied to the grids of both sections of tube 810 is again altered so that the right-hand section will repeat positive pulses applied to the control grid thereof, whereas the right-hand section will not.

The application of the second negative pulse to the control grid of tube 710 causes a second positive pulse to be repeated in the output circuit of this tube and applied to the control grids of all the tubes 711, 712, 713 and 714. At this time, current is flowing in the output circuit of tube 711; consequently the application of a more positive potential to this control grid does not alter the operation of this tube.

The bias potential applied to the control elements of tubes 713 and 714 is such that magnitude of the positive pulse applied to their control elements at this time is insufficient to initiate a discharge through these tubes. Inasmuch as a discharge is already flowing through the output and thus through the cathode circuit of tube 711 the potential of its cathode will be relatively high and near to the potential of the anode battery 724 with the result that a more positive bias is applied to the grid of tube 712. This more positive bias as applied to the grid of tube 712 is insufficient however to initiate a discharge through this tube. However, the application of the positive pulse from the output circuit of tube 710 to the grid of this tube as described above and a more positive bias are sufficient to initiate a discharge through tube 712. As a result, potential of the cathode of tube 712 will rise to substantially the potential of battery 724 less a small tube drop of 15 or 20 volts.

Prior to the initiation of a discharge through tube 712 and during the time of the discharge through tube 711 the condenser 725 becomes charged with its left-hand terminal at a potential equal to the potential of the cathode of tube 711 which is near the potential of battery 724 and its left-hand terminal at the potential of the cathode of tube 712 which is approximately ground potential. Upon the initiation of discharge through tube 712 the potential of its cathode rises to approximately the potential of battery 724 and causes both terminals of the condenser 725 to rise a substantially similar amount with the result that the potential of the cathode of the tube 711 rises to a value of 150 to 190 per cent of the magnitude of battery 724. In other words, the potential of cathode of tube 711 rises above the potential of the anode of this tube for a short interval of time during the discharge of condenser 725, and as a result the discharge flowing through tube 711 is interrupted. The interruption of the discharge through tube 711 causes the cathode of this tube to return to substantially ground potential and in turn applies a blocking potential to the control grid of the left-hand section of tube 717. As a result the left-hand section of tube 717 no longer repeats the pulse applied to the control element thereof.

The initiation of discharge through tube 712 raises the potential of its cathode as described above and this in turn in addition to the interrupting of discharge from the tube 711 as described above applies a more positive bias to the right-hand section of tube 717 which bias is adjusted to cause this section to repeat the pulses applied to it.

Figure 9:
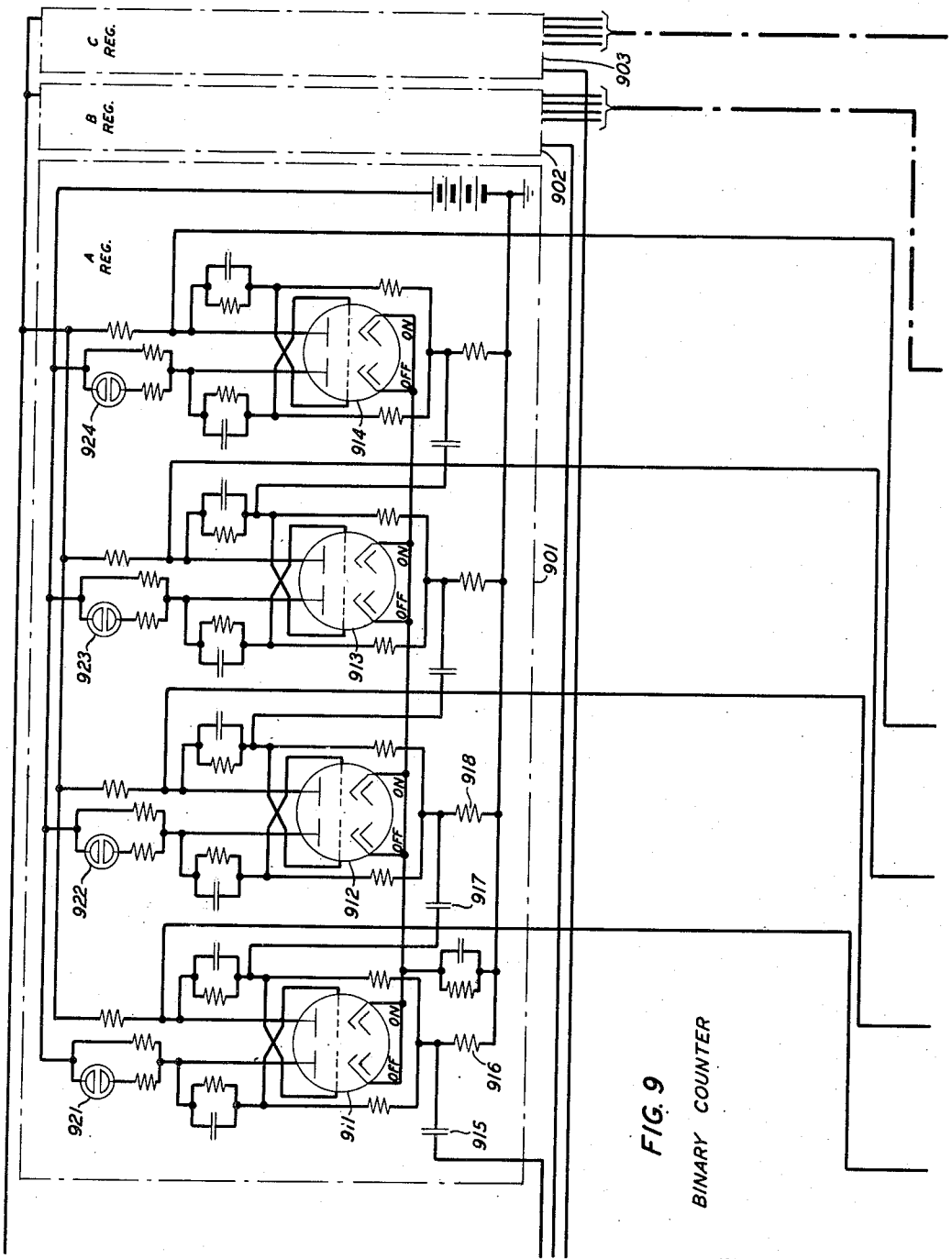
Figure 10:
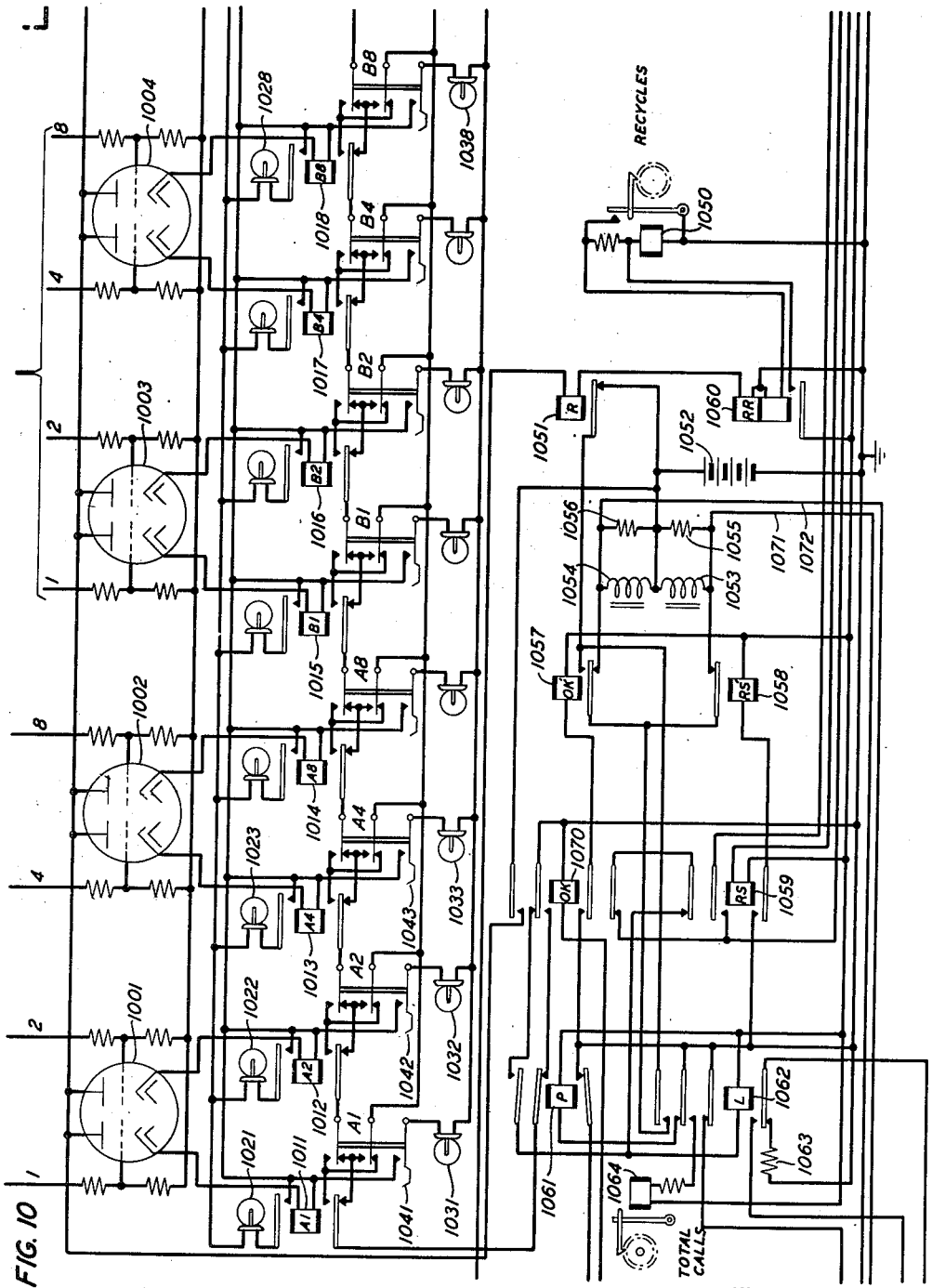
Figure 11:
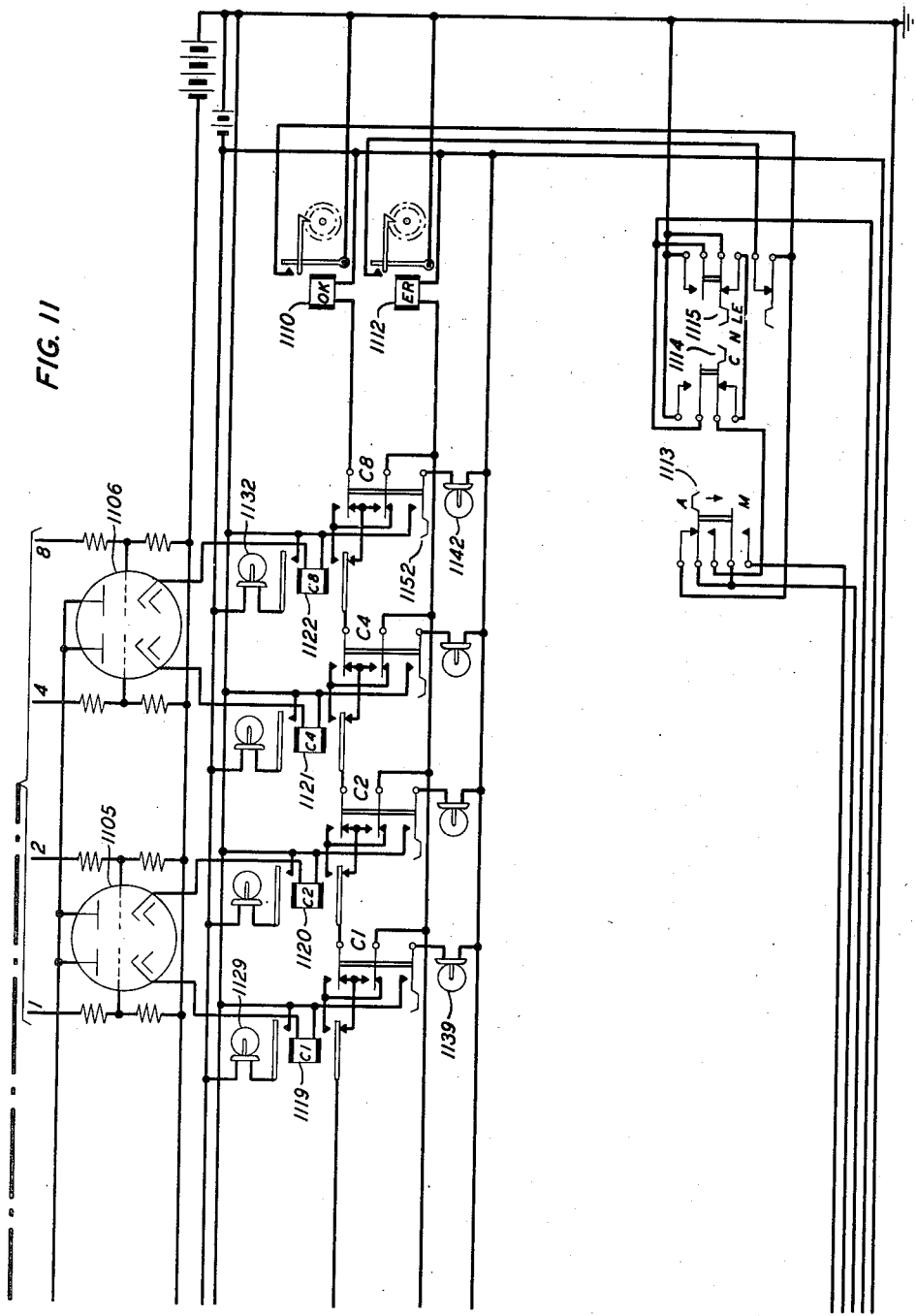

The interruption of the current through the right-hand section of tube 413 allows the anode potential of this section to rise which in turn causes the cathode of tube 420 to rise in the manner described above. As a result, the operation of the multivibrator circuit comprising tube 421 is again initiated and the first seven pulses therefrom will be counted by the seven-counter shown in Fig. 8 in the manner described above. At the end of this time interval, the current through the left-hand section of tube 811 is interrupted and current through the right-hand section of this tube is initiated. As a result, the right-hand section of tube 810 is blocked so that this tube will no longer operate to repeat pulses applied to its control element and the bias potential applied to the grid of the left-hand section raises so that the left-hand section will repeat the succeeding pulses in its output or cathode circuit which pulses are now repeated by the right-hand section of tube 717 to the second one of the counting and registering circuits 902. Thereafter the counter 902 will count succeeding pulses from the multivibrator circuit 421. The reception of the second stop pulse will again interrupt the operation of multivibrator 421 and stop counter 902. Each of the succeeding start pulses received over the incoming line operates in the above-described manner to initiate the operation of the multivibrator tube 421 and each of the following stop pulses will interrupt the operation of this circuit in substantially the same manner as described above. The output pulses from the multivibrator 421 for each of the series of pulses represent the magnitude of a digit or character of the symbol of the called subscriber's station number or identification symbol to be counted by counters 901, 902 and 903. The three counters enumerated in Fig. 9 are provided for purposes of illustration, it being assumed that any suitable number of such counters as may be required will be provided. It is assumed in the exemplary embodiment of this invention described herein that three such counters are required to control the switching at the central switching point. If more digits are required, more counters similar to that shown in Fig. 9 will be provided.

The above-described operation of the receiving equipment is illustrated in Figs. 13 and 14 which show graphs of the wave form of the voltage or current at various places in the circuit. The first line or graph of Fig. 13 represents the last five pulses shown in the first line or graph of Fig. 12. Graph 1302 shows the wave form of the pulses as received from the volume limiting amplifier of Fig. 3. When the amplitude of the received pulses exceeds a reference or predetermined value, i. e., crosses the bias or reference line 1303 a discharge is initiated through tube 411 similar to the manner in which discharge is initiated through tube 520. Initiation of the discharge through tube 411 causes a pulse of short duration at the anode of tube 411. These pulses are represented at 1304, 1305, etc. of Fig. 13. These negative pulses are applied through the coupling condenser 416 to the control grid of the left-hand section of tube 412 and interrupt the current flowing through this section of tube 412. As a result current starts to flow through the right-hand section of this tube and in turn reduces the voltage of the second grid or second element of tube 411 so that no further discharges may be initiated through tube 411 at this time. As pointed out hereinbefore both sections of tube 412 are connected in a single stability circuit and after the interval of time, determined by the magnitude of the condensers 423 and 426 and related resistors, current again starts to flow through the left-hand section of tube 412 which in turn interrupts the current flowing through the right-hand section. As a result the voltage applied to second control element tube 411 is restored to its more positive value so that tube 411 may again respond to received pulses. Graph 1306 represents the voltage of the anode of the right-hand section of tube 412 and thus the voltage of the second control element of tube 411. As shown in Fig. 13 this voltage is reduced upon the reception of a start pulse and remains at a low value during the time this pulse is dying out. At the end of the pulse and before the time at which a stop pulse representing a digit of magnitude 1 can be received, the voltage of the second control element of tube 411 again rises so that the circuits are in condition for receiving and responding to the stop pulse when it is received.

The negative pulse from tube 411 in response to the reception of the first start pulse is also applied through the coupling condenser 415 to the control elements of both sections of tube 413. This negative pulse interrupts the flow of current through the right-hand section of tube 413 and upon the termination of the pulse current flows through the left-hand section of tube 413. Thereafter, current continues to flow through the left-hand section of tube 413 and does not flow through the right-hand section of this tube until the stop pulse is received. Graph 1307 shows the voltage of the anode in the right-hand section of tube 413 which voltage rises upon reception of the start pulse.

As described hereinbefore, the output or anode of the right-hand section of tube 413 is coupled through tube 420 to the left-hand section of the timing multivibrator or oscillator tube 421. Tube 421 normally has current flowing through its right-hand section and no current flowing through its left-hand section. However, upon the application of a more positive voltage to the control element of tube 420 which voltage is repeated to the control element of the left-hand section of tube 421 as described herein, the multivibrator circuit of tube 421 is set into operation and causes a series of pulses to be generated. These pulses are applied through the coupling condenser 425 to the switching tube 810. The wave form of these pulses is substantially as represented by graph 1308.

Upon the reception of the first start pulse as described above and in response thereto the left-hand section of tube 413 starts to conduct current with the result that the voltage of its anode is reduced. This reduction of voltage causes a negative pulse to be applied to the control element of the right-hand section of tube 811 through the coupling condenser 821, thus interrupting the current flowing through this section and initiating a flow of current through the left-hand section of this tube. As a result the voltage of the anode of the right section of tube 811 and thus the bias voltage of the control element of the right-hand section of tube 810 becomes more positive so that the right section of tube 810 repeats the pulses from tube 421 to the counting circuit shown in Fig. 8.

Graph 1309 illustrates the voltage of the anode of the right-hand section of tube 811 and the bias voltage of the grid of the right-hand section of tube 810. Graph 1310 illustrates the pulses repeated through the right-hand section of tube 810 to counting circuit of Fig. 8. As described above. the counter counts these pulses and upon the reception of the seventh pulse which it will be noted is about the end of the time allowed for the transient due to the start pulse to die out, the counter circuit applies a negative pulse to the control grid of the left-hand section of tube 811 thus interrupting the flow of current through this section. At the termination of the negative pulse a discharge through the right-hand section of tube 811 is initiated. As a result, the grid bias voltage applied to the right-hand section of tube 810 falls as is illustrated in graph 1309, so that no further pulses are transmitted through the right-hand section of tube 810 at this time.

Figure 7:
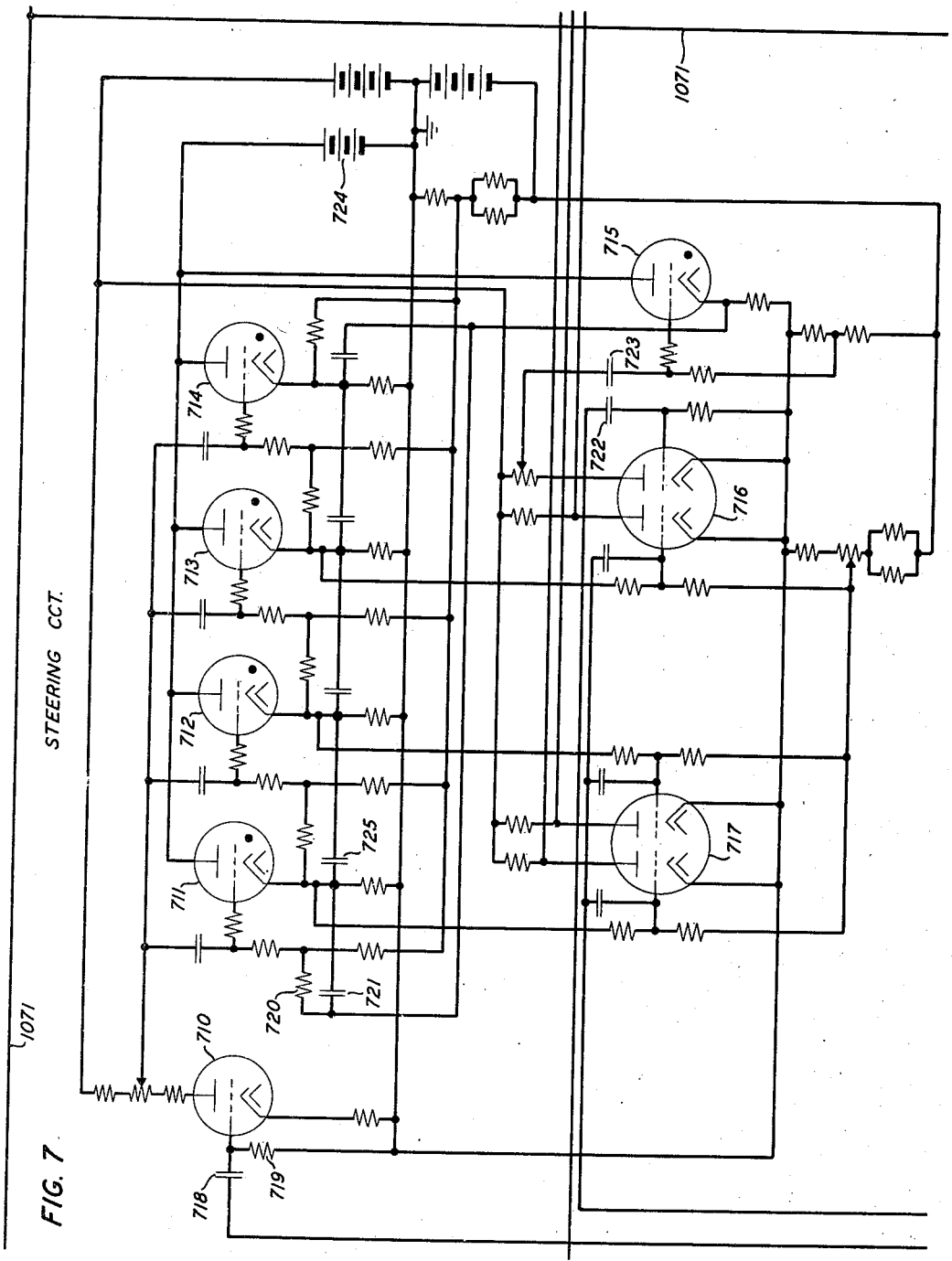
Figure 8:
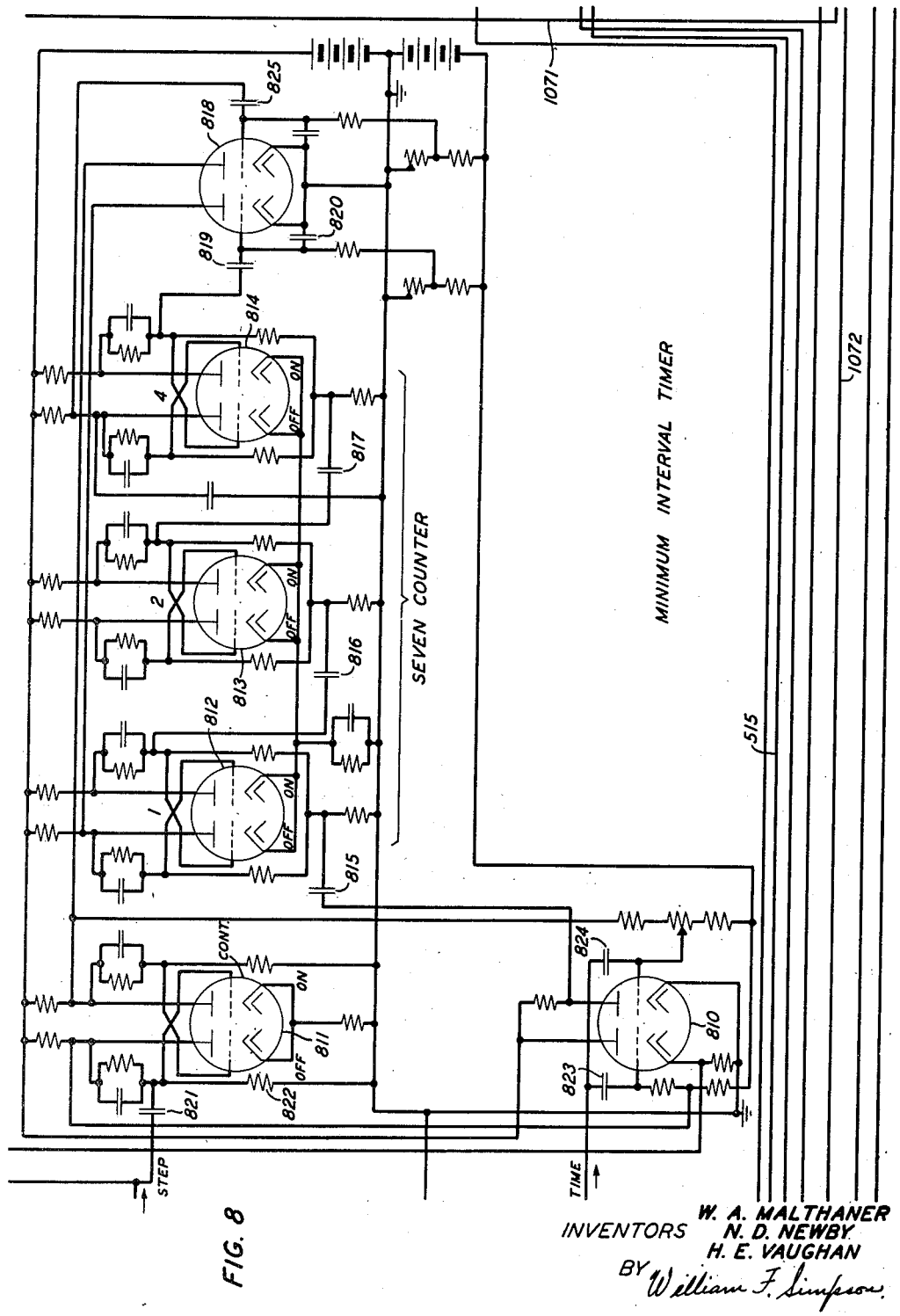

The bias voltage applied to the grid of the left-hand section of tube 811 rises at this time to the value required to cause this section to repeat the pulses from tube 421 to the counter circuits of Fig. 9 through the steering circuits of Fig. 7. Graph 1311 illustrates pulses transmitted through the left-hand section of tube 810 and then through the steering circuit to the digit counter circuits shown in Fig. 9. If the stop pulse had been received immediately after the first seven pulses were recorded by counting circuit shown in Fig. 8 then only one pulse would be transmitted to the digit counting circuits. However, as assumed above, the first digit was a zero, consequently the stop pulse is not received until ten pulses have been transmitted to the digit counting and storing circuits of Fig. 9. Upon the reception of the stop pulse at this time the circuits of tube 413 are again operated in the manner described above, with the result that further discharges are prevented through tube 411. As will be noted from graph 1306 the control voltage of the second grid is reduced at this time. In addition, the circuits of tube 413 are restored to their initial position in response to the stop pulse, so that multivibrator tube 421 is stopped as illustrated in graph 1308. As a result, the counter circuit in Fig. 9 will record ten pulses or zero for the first digit. Also the circuits of tube 412 will maintain tube 411 unresponsive until the transient associated with the stop pulse has substantially died out. At the end of this time the next start pulse will be received and the circuits will respond in substantially the same manner as described above, except as it is assumed that the second digit has a magnitude of four, with the result that only four pulses are transmitted to the digit counting circuits of Fig. 9 when the stop pulse is received.

As pointed out above, upon the reception of a start pulse the left-hand section of tube 413 becomes conducting with the result that the voltage of the plate of this section falls to a relatively low value. This voltage then stays at this low value until the stop pulse is received at which time the left-hand section of tube 413 ceases to conduct current. As a result the voltage of this section rises at this time. These voltage changes are illustrated by graph 1401 of Fig. 14.

Each time the voltage of the left-hand section of tube 413 falls the negative pulse is applied to the control grid of the right-hand section of tube 811 and to the control element of tub 710. These are illustrated by graph 1402 of Fig. 14. As described herein the negative pulse applied to the grid of tube 710 is repeated as a positive pulse in its output circuit which positive pulse initiates a discharge through tube 711 and interrupts the discharge through tube 715. Tube 711 is a gas conduction tube in which current continues to flow until interrupted in some manner. Current flowing through tube 711 causes the voltage of its cathode to rise and applies a more positive bias to the grid of the left-hand section of tube 717, so that this section repeates pulses 1311 to the digit counter circuit 901 of Fig. 9. Upon the reception of the second start pulse another negative pulse will be applied to the control grid of tube 710 as shown in graph 1402. This causes discharge to be initiated through tube 712 and the discharge through tube 711 interrupted. As a result, as the voltage of the cathode of tube 711 falls the voltage of the cathode of tube 712 rises.

Graph 1403 shows the voltage of the cathode of tube 711 and graph 1404 shows the voltage of the cathode of tube 712. Thereafter, the system operates substantially as described above with the result that the right-hand section of tube 717 now repeats the pulses to the circuit 902. Upon reception of the third start pulse a discharge is initiated through tube 713 and discharge through tube 712 interrupted. Graph 1405 illustrates the voltage of the cathode of tube 713 in the interval of time in question. If additional tubes and counting circuits are provided these tubes will be actuated in sequence as described above, and the proper pulses directed to the proper digit counting circuits.

Each of the succeeding pair of pulses comprising a start pulse and a stop pulse causes the circuits to operate in the manner similar to that described above. As long as the pulses are required to control the switching circuits at the switching center at which they are received they will cause counters similar to the counter shown in Fig. 9 to record the magnitude of the digit or character of the symbol represented by the pulses. If the digital positions of the number or symbol are not required at the switching center cycles or pulses output of multivibrator 421 will not be counted for digits not required to control the switching circuits. However, the seven-counter and related switching circuits will be operated in the manner described above. If additional tubes similar to tubes 711, 712, 713 and 714 are provided they likewise will be actuated as described above, one step for each of a digital position of the number. As shown in Fig. 7, four such tubes are provided and three numbers for digital positions are recorded. Each one of the tubes 711, 712, 713 and 714 has a discharge created through it by the start pulse of the respective digits of the number. After the pulses representing the fourth digit have been received, the tube 714 will remain conducting until extinguished by an initiation of discharge through tube 715 in a manner described herein.

It is obvious, if it is desired to determine the character or magnitude of the digit or symbol or any other digital positions of the number or of the subscriber's designation, additional tubes similar to tubes 711 through 714 will be included in the distributor chain of these tubes and will control switching and repeating tubes in the manner similar to that described above with reference to tubes 717 and 716 shown in Fig. 7. If it is desired to determine the magnitude of each of the digits in all eight digital positions then eight tubes similar to tubes 711 through 714, inclusive, will be provided and connected in or added to the chain circuit comprising tubes 711 through 714. In addition four more sections of tubes similar to sections of tubes 716 and 717 will also be provided for repeating the pulses representing the respective digits to the proper counting circuits such as 901, 902, 903 and so forth. Also, it will be understood that in case it is necessary to determine the magnitude of all of the digits, as for example, eight in the specific exemplary embodiment set forth herein, eight counting circuits similar to 901, 902 and 903 will be provided.

As shown in the drawing, the three counting circuits 901, 902 and 903 are employed to record the magnitude of the digits in the first three digital positions of a complete subscriber's designation. It is obvious that one such counter will be necessary for each digital magnitude of which it is necessary to determine. Thus, if it is necessary to determine the magnitude of the first four digits, an additional counter will be employed and connected to the steering circuit in the next position after the position controlled by tube 713.

When it is necessary to determine the magnitude of only a portion of the final digits of the subscriber's designation then the counters connected to the first stages of the steering circuits such as 711, 712 and so forth may be omitted and counters provided for and connected to the tubes associated with the final digits of the complete subscriber's designation. In case it is desired to determine the magnitude of certain of the intermediate digits of the subscriber's number counters will be associated with the steering circuit tubes rendered active at the time pulses representing these intermediate digits are received. In this case counters associated with the first stages may be likewise omitted and the counting and steering stages associated with the final digits may also be omitted.

It should be noted that the output of tube 411 in addition to being connected to tubes 412 and 413 as described above is also connected through coupling condenser 626 to both grids of both sections of tube 621. The coupling condenser 626 together with resistor 646 has a short time constant so that the pulse applied to the grids of tube 621 is quite short in time. Pulses of this type are sometimes referred to as differentiated pulses and the condenser 621 and resistor 646 are frequently referred to as a differentiating network.

Both sections of tube 621 are connected in a double stability circuit to form one stage of the sixteen-pulse counter, both sections of tube 622 are similarly connected in a double stability circuit to form a second stage of the counter, and the sections of tubes 623 and 624 which similarly form a third and fourth stage of the counter. These tubes are normally conditioned with the right-hand section conducting and the left-hand section non-conducting in a manner to be described hereinafter. The application of each of the negative pulses resulting from the discharge created in tube 411 causes this counter to count one. Thus the first pulse reverses the conducting conditions in the first stage, the second pulse reverses them back again and reverses the conditions in the second stage. The third pulse merely reverses the conducting conditions of the sections of the first stage. The fourth pulse then reverses the conducting condition of the first three stages and so on as is well understood by persons skilled in the operation of binary counter circuits.

As set forth hereinbefore the exemplary embodiment of this invention described herein in detail is arranged to cooperate with subscriber's dial pulse equipment which transmits pulses which represent eight digital positions or eight symbols of a subscriber's number or designation. Inasmuch as the magnitude of the digit in each of the digital positions of the number is represented by two pulses a complete subscriber's number or station designation will be represented by sixteen pulses.

Figure 6:
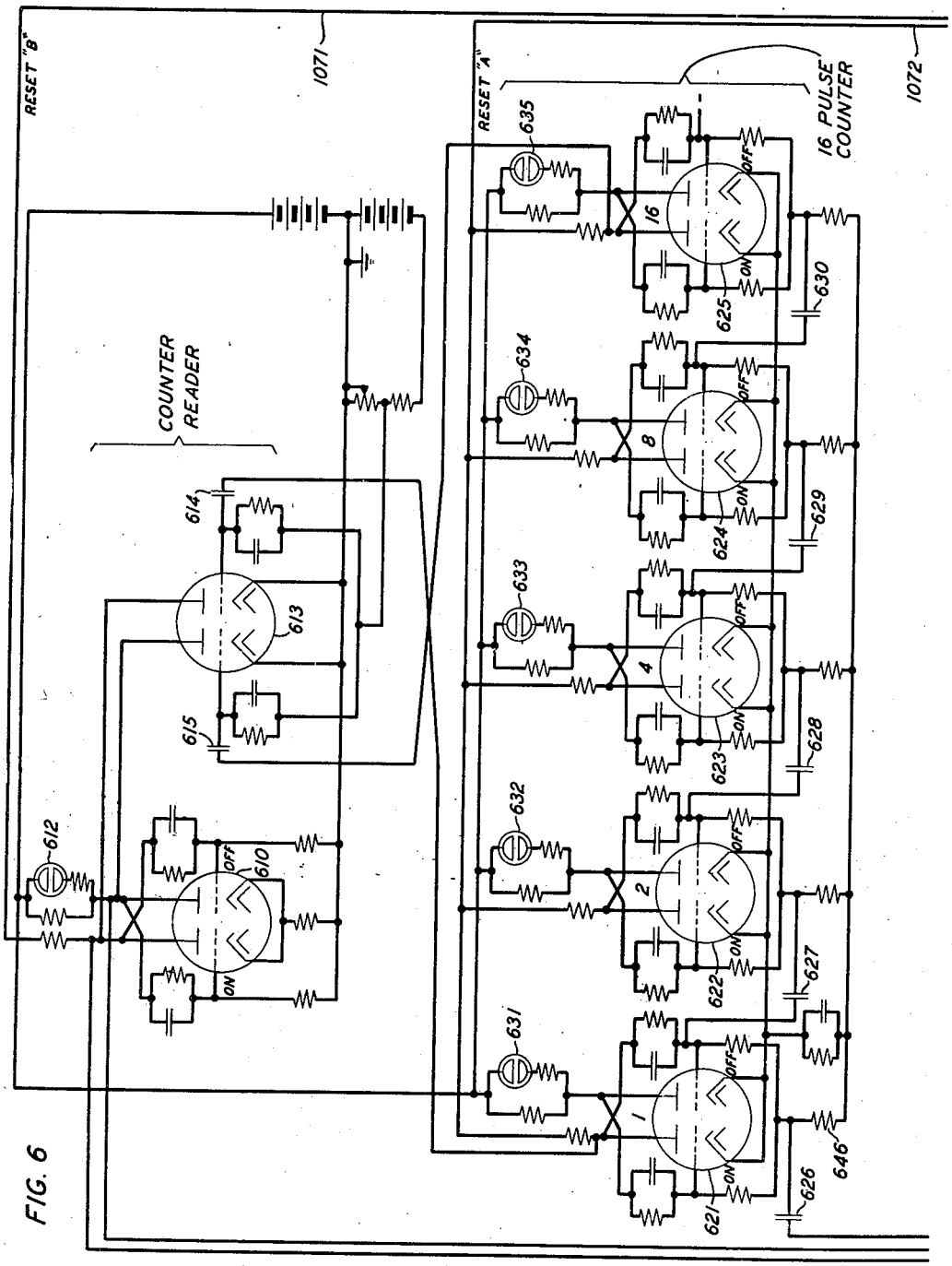

If and when the sixteen pulses are received by the counter the conducting conditions of the first four stages will be returned to their normal conditions as shown in Fig. 6 whereas the conducting conditions in the final stage will be reversed. Thus a current will be initiated through the right-hand section of tube 625 and the current through the left-hand section interrupted. The interruption of a discharge through the left-hand section of tube 625 causes the potential of the anode of this section to rise and apply a positive pulse through the coupling condenser 615 to the control grid of the left-hand section of tube 613. Tube 613 repeats the corresponding but negative pulse in the common anode resistor of the anode right-hand section of tube 610. This pulse is applied to the control grid of the left-hand section of tube 610 and interrupts the discharge through this tube. At the termination of this pulse, the right-hand section of tube 610 will start to conduct current. If another pulse is received the first stage of the counter has the potential and conducting conditions of the sections reversed so that the current through left-hand section is interrupted and a current initiated through the right-hand section of tube 621. The interruption of current through the left-hand section causes the anode potential of this section to rise applying a positive pulse to the control element of right-hand section of tube 613 through coupling condenser 614. This tube will repeat a corresponding negative pulse in the common anode resistor of the left-hand section of tube 610 and apply a negative pulse to the control grid of the right-hand section and interrupt any current flowing through this section. It is thus apparent that current will flow through the left-hand section of tube 610 at all times except immediately after the reception of the sixteenth pulse by the counter. Unless sixteen pulses are received by the counter, current will flow through the left-hand section of tube 610. If more than sixteen pulses are received by the counter, current will also flow through the left-hand section of tube 610. If only sixteen pulses are received by the counter shown in the lower half of Fig. 6, current flows through the right-hand section of tube 610 but not through the left-hand section thereof.

During the time the pulses are being received representing the subscriber's number as described above, tube 410 in addition to repeating pulses to tube 411 described above, repeats them to tube 520 and initiates a discharge through this tube in response to each of the received pulses. The discharges through tube 520 discharge condenser 524 so that the potential of the upper terminal of this condenser does not rise to a sufficiently positive value to initiate a current flow through the left-hand section of tube 521. It will be recalled that on the reception of the first pulse after the blank interval condenser 524 was discharged through tube 520 which in turn interrupts the current flowing through the left-hand section of the tube 521.

A second blank interval or pause will be received following the reception of all the pulses representing a subscriber's complete designation. During this pause the upper terminal of condenser 524 will be charged sufficiently positive to initiate current through the left-hand section of tube 521. This current again applies a negative potential to the control grid of the right-hand section of this tube and interrupts the discharge flowing therethrough. Due to the action of common cathode resistor, current continues to flow through the left-hand section of tube 521 until interrupted as will be described hereinafter.

When current starts to flow through the left-hand section of tube 521 the potential of the anode of this section is reduced so that a negative pulse from the anode of the left-hand section of tube 521 is applied through the coupling condenser 722 to the control element of the right-hand section of tube 716. Tube 716 will repeat this negative pulse and cause the corresponding positive pulse to be applied to the control grid of the gas tube 715 through the coupling condenser 723. The application of a positive pulse to the control grid of tube 715 initiates a discharge through tube 715 which discharge causes a discharge through tube 714 to be interrupted. In addition, a discharge through tube 715 conditions tube 711 so that upon the reception of a pulse from tube 710 a discharge will be initiated through tube 711.

It will be recalled that in response to the first blank interval current is initiated through the right-hand section of tube 521 and the current through the left-hand sections of tubes 522 and 523 interrupted. Thereafter the current continues through the right-hand section of tube 522 while the left-hand section of tube 522 and left-hand section of tube 523 remain non-conducting. As a result the right-hand section of tube 523 is conditioned to repeat the next pulse applied to the control grid. Upon reception of the second blank interval when current is initiated through the left-hand section of tube 521 a negative pulse is again applied to the control grid of the right-hand section of tube 523. Tube 523 in turn repeats a corresponding positive pulse in its output circuit which pulse is applied to the control grids of both sections of tube 510.

The operation of the circuit at this point depends upon the previous response of the circuit to the pulses representing the complete subscriber's station designation. If the sixteen pulses have been received and recorded by the sixteen-pulse counter shown in the lower portion of Fig. 6 the circuit responds in one way as will be described hereinafter. If a greater or lesser number than sixteen pulses have been received the circuit will respond in a different way. Assuming for purposes of illustration either a greater or lesser number than sixteen pulses have been received. Under these circumstances the left-hand section of tube 610 will be conducting and the right-hand section non-conducting with the result that the grid bias applied to the grid of the left-hand section of tube 510 will block this section so that it will not repeat the pulses applied thereto. On the other hand the grid bias applied to the right-hand section of tube 510 will be of such a value that a tube will repeat the positive pulses applied to its control grid. When the positive pulse from the right-hand section of tube 523 is therefore applied to the grids of both sections of tube 510 the pulse will not be repeated by the left-hand section but will be repeated as a negative pulse in the output circuit of the right-hand section thereof.

The right-hand section of tube 510 has its anode connected to a single stability circuit comprising both sections of tube 511 in which the right-hand section is normally conducting and the left-hand section non-conducting. Upon the application of a negative pulse to the grid of the right-hand section of tube 511 from the plate of the right-hand section of tube 510, the current through the right-hand section of tube 511 is interrupted and current initiated through the left-hand section thereof. The initiation of current through the left-hand section of tube 511 causes a negative pulse to be applied to the control grid of the right-hand section thereof through condenser 517. A short interval of time thereafter condenser 517 becomes sufficiently charged so the grid of the right-hand section of tube 511 reaches the voltage necessary to cause current flow to be again initiated through the right-hand section of this tube which current then causes the current flowing through the left-hand section to be interrupted and the circuits of the tube restored to their normal condition. The magnitude of condenser 517 together with the value of the resistors connected thereto controls the time interval during which a discharge of current flows through the left-hand section of tube 511 and the current flowing through the right-hand section is interrupted.

Upon the interruption of current flowing through the right-hand section of tube 511 the potential of the anode of this section increases with the result that the potential of the control grid of the right-hand section of tube 513 rises. The right-hand section of tube 513 operates as a cathode follower. Consequently the potential of the cathode of this tube likewise rises and causes current to flow through relays 1051 and 1060. Relay 1060 in operating completes a circuit for the operation of the recycle register 1050 to record the number of times it is necessary to recycle the equipment.

Relay 1051 in operating removes a short circuit from around both inductances 1054 and 1053 which in effect generates and applies a negative pulse to leads 1071 and 1072.

When the short circuit around inductances 1053 and 1054 is removed by the operation of relay 1051, the battery supply current over leads 1071 and 1072 is in effect momentarily interrupted. This interruption may be considered equivalent to the application of a negative pulse to these leads. The shape and duration of the pulse is controlled by the size of the inductors 1053 and 1054 as well as the magnitude of the shunting resistors 1055 and 1056. The momentary interruption of current over lead 1071 is equivalent to a negative pulse applied to the right-hand sections of the anodes of all of the tubes of the counters 901, 902, etc. The anodes of the right-hand sections of these tubes are coupled to the grids of the left-hand sections so that any discharges through the left-hand sections are interrupted thus restoring all the counter stages to their initial condition. Similarly, a negative pulse is applied to the control grid of the right-hand section of tube 610. However, inasmuch as this section is not conducting current under the assumed conditions, the left-hand section continues to conduct current. The negative pulse is also applied to the grid of the left-hand section of tube 512. However, since this section is not conducting current the negative pulse produces no effect at this time. The momentary interruption of the current to lead 1072 restores each of the counter stages of the sixteen counters shown in the lower portion of Fig. 6 to their initial condition. This negative pulse is also applied to the control grid of the left-hand section of tube 413, thus interrupting any current flowing through this section and restoring the circuits of this tube to their initial condition.

When the left-hand section of tube 511 ceases to conduct and the right-hand section starts to conduct current as described above, the potential of the anode of the right-hand section of tube 511 falls to a relatively low value so that the current flowing through the right-hand section of tube 513 likewise falls to a relatively low value or is cut off thus releasing relay 1051. If the recycle register 1050 is not fully operated at this time, relay 1060 will remain operated due to current flowing through its lower winding until the recycle register 1050 is fully operated to register the operation of the recycle equipment. Upon the complete operation of register 1050, relay 1060 is released. After the completion of the short pulse due to the operation of relay 1051, the circuits are in condition to respond to the next set of pulses from the subscriber's station.

Thereafter, when the next pulse of the succeeding subscriber's station designation is received, the discharge through the left-hand section of tube 521 is interrupted and a discharge initiated through the right-hand section of this tube. Similarly, a discharge is initiated through tube 411 in the same manner as described above at the termination of the first blank interval. Thereafter, the circuits operate in substantially the same manner described above upon the reception of the pulses representing the first complete subscriber's number or station designation. After the complete series of pulses is received the circuits respond as described above and a third blank interval will be received. If any number of pulses other than sixteen has been received in this series, the left-hand section of tube 610 will again be conducting and the recycling equipment operated as described above. If, however, sixteen pulses have been received designating the subscriber's station, the current flowing through the left-hand section of tube 625 is interrupted and this in turn causes the current flowing through the left-hand section of tube 610 to be interrupted. As a result when the positive pulse is applied to both grids of tube 510 from the anode circuit of the right-hand section of tube 523, the pulse will be repeated by the left-hand section of tube 510 instead of the right-hand section as described above. Positive pulse applied to the grids of this tube is repeated as a negative pulse in the output circuit of the left-hand section of tube 510. This pulse is applied to the grid of the right-hand section of tube 512.

Tube 512 is normally conditioned with the right-hand section conducting and the left-hand section non-conducting. However, upon the application of a negative pulse to the control grid of the right-hand section current flowing through this section is interrupted and a current is initiated through the left-hand section. Thereafter, the current continues to flow through the left-hand section until interrupted as will be described hereinafter. Due to differences in the anode resistors of the right- and left-hand sections of this tube the current flowing through the left-hand section is much less than the current flowing through the right-hand section with the result that the cathode of both sections falls to a much lower potential when the current through the right-hand section is interrupted and current initiated through the left-hand section as described above. As a result, the potential of the control grid of the right-hand section of tube 522 becomes more negative and interrupts the current through the right-hand section of this tube. As a result, the potential of the grid of the left-hand sections of tubes 522 and 523 becomes more positive causing current to flow through these sections. Thus the start circuit shown in the lower portion of Fig. 5 and designated 134 in Fig. 1 is restored to its initial condition wherein the right-hand section of tube 513 is biased to cut-off so that it will not repeat negative pulses applied to its control grid.

When the current flowing through the right-hand section of tube 512 is interrupted as described above, the potential of its anode and thus the potential of the grid of the left-hand section of tube 513 which is connected to it rises and causes the current to flow over lead 515 through relay 1070 causing the operation of relay 1070. Relay 1070 in operating, completes an obvious circuit for the operation of relay 1057. Relay 1057 in operating interrupts a short circuit around the winding of inductance coil 1054, and thus in effect applies a negative pulse to the reset lead 1072. Reset lead 1072 extends to the circuit of tube 413 and to the sixteen-pulse counter, thus restoring these circuits to their initial condition wherein they are ready to respond to more pulses. The circuits of the counter shown in Fig. 9, however, are not restored at this time because the short circuit has not been removed from around the inductance 1053.

The operation of relay 1070 applies battery 1052 to the anode circuits of tubes 1001, 1002, 1003, 1004, 1105, 1106 and any other similar tubes which may be provided. Tubes 1001 and 1002 are associated with the A counter designated 901 in Fig. 9. Tubes 1003 and 1004 are associated with the B counter designated 902 in Fig. 9. Similarly tubes 1105 and 1106 are associated with the C counter 903 shown in Fig. 9. Similar pairs of tubes will be provided for each additional counter which may be required at the switching center. These tubes 1001 through 1106 as described above operate as cathode follower tubes and cause the relays associated with their cathode circuits to be operated in accordance with the position of the various stages of respective counters. Thus the left-hand section of tube 1001 causes relay 1011 to be operated if the first stage 911 of counter 901 has been operated. That is, the current flowing through the right-hand section of tube 911 has been interrupted and a current through the left-hand section initiated. In a similar manner relay 1012 is operated if the second stage of the counter is operated at the time relay 1070 operates. In a similar manner the condition of all the other counter stages are transferred to relays 1011, 1012 through 1018 and 1119 through 1122, respectively. The operation of these relays light the corresponding lamps 1021 through 1028 and 1129 through 1132. The positions of these relays may be then used to control the selection of switching paths or selection of other functions of the switching equipment which may be desired. Such use of the contacts of these relays is described in the above-identified application of Malthaner case 13.

If it is desired to check the setting of these relays, as a test of over-all receiver operation, the associated keys 1041, 1042, 1043 and similar keys associated with the other relays are set in accordance with the expected code. The operation of these keys causes the associated lamps 1031, 1032, 1033, etc. to be lighted. Contacts of respective relays 1011 to 1018 and 1119 to 1122 and the contacts of the associated keys are wired in the circuit such that if the relay settings correspond to the settings of the keys, a circuit will be prepared for the operation of register 1110, whereas if any one or more of the keys is set in the opposite position from the relay associated therewith the circuit will be prepared for the operation of the error register 1112.

The operation of relay 1070 as described above interrupts both the operating and locking circuit of relay 1062 thus causing this relay to release. The release of relay 1062 again terminates the incoming line 312 through the terminating resistor 1063. The release of relay 1062 also connects ground to the left-hand terminal of resistor 327 thus discharging the upper terminal of condenser 326 and increasing the gain of the amplifier tubes 316 and 317 to their maximum. The release of relay 1062 also completes an obvious circuit for the operation of relay 1061. Relay 1061 in operating connects ground to the upper terminal of condenser 524 and thus lowers the potential of the grid of the left-hand section of tube 511, preventing or thus interrupting any current through this section of the tube and initiating the current in the right-hand section of tube 521 which restores the circuits of this tube to their idle or normal condition. The operation of relay 1061 also completes the circuit from ground through the upper inner operated contact of relays 1070 and 1061 and through the contacts of relays 1011 through 1018 and 1119 through 1122 and contacts of the associated keys to either the register 1110 or the error register 1112 thus operating one or the other of these registers. If key 1114 is operated, the operation of either of the registers 1110 or 1112 completes the circuit for the operation of the reset relay 1059. Relay 1059 completes an obvious circuit for the operation of relay 1058. Relay 1058 in operating interrupts the short circuit from the inductor 1053 thus applying negative pulse to conductor 1071 to restore the circuits of tubes 610, 512 and the circuits of the counter stages of counters 901, 902, 903, etc.

Meantime, the relays 1011 through 1018 and 1119 through 1122 will have been locked operated by means of circuits not shown so that the number or designations represented by them may be employed in the switching system in any suitable manner. When the circuits of tube 512 are restored to their normal or idle condition, current will start to flow through the right-hand section of tube 512 thus lowering the potential of its anode and the control grid and the left-hand section of tube 513. Tube 513 will then interrupt the current flowing through relay 1070 which relay will release and restore the circuit to its normal or idle condition.

If it is desired to stop the operation of the system if the number is not correctly received, the error key 1115 is operated instead of key 1114. These two keys may be operated by the same lever by moving the actuating member in one direction to operate one set of contacts and in the other direction to operate the other set of contacts. If key contacts 1115 are operated, the operation of the register counting device 1110 causes these circuits to be restored to their initial condition as described above. If, however, the error register 1112 is operated, reset relay 1059 will not be operated until the key contacts 1115 are restored to normal by an operator or attendant.

Upon the restoration of key 1115 the circuit for the RS relay 1059 is completed and the restoration of the other circuits proceeds as described above.

A group of three keys 1113, 1114 and 1115 are provided to control the operation of the system. With key 1113 in position shown in the drawing the circuit will automatically continue to receive and store pulses so long as they are transmitted to it. If key 1113 is moved from the automatic to the manual position then the circuit will respond to one complete set of pulses designating the subscriber's station. When such pulses are properly received the circuit will stop until key 1114 or 1115 is released and reoperated. With the key contacts 1114 operated and key 1113 in the position shown the circuit will continue to operate automatically and record the proper and any erroneously received pulses. If the switch or key 1114 is left in the position shown and key 1115 operated then the circuit will operate continuously so long as each series of pulses is properly received representing the proper digits. In case the pulses are not properly received circuit will stop and wait until operator or attendant releases key 1115 and resets the keys as desired.

What is claimed is:

1. A signal receiver for responding to signals variably spaced in time comprising apparatus responsive to received signals, pulse generating equipment, means responsive to a received signal for initiating operation of said pulse generating equipment, other apparatus responsive to the next succeeding similar signal for stopping the operation of said pulse generating equipment, means for counting the number of pulses generated by said pulse generating equipment between said signals, other apparatus for counting the total number of signals and apparatus responsive to more than a predetermined number of said signals for preventing the utilization of the number of counted pulses.

2. A signal receiver comprising apparatus responsive to received signals, pulse generating equipment for determining the time interval between two received signals including means for generating a plurality of pulses between said two received signals, apparatus for discarding a predetermined number of said pulses, and other apparatus for utilizing the remaining number of said pulses.

3. A signal receiver comprising in combination apparatus responsive to received signals, pulse generating equipment interconnected with said apparatus responsive to received signals for determining the time interval between two received signals by generating pulses between said two signals, apparatus connected to said pulse generating equipment for discarding a predetermined number of said pulses, other apparatus interconnected with said generating equipment for utilizing the remaining number of said pulses, and apparatus interconnected with said apparatus responsive to received signals controlled by the total number of signals received within a predetermined time interval for controlling the utilization of said remaining pulses.

4. In a switching system means for receiving repeated series of calling pulses representing a station designation wherein the series of pulses representing a complete designation are separated by intervals of time longer than the intervals occurring between the individual pulses of each series of pulses representing a station designation comprising receiving apparatus, means for normally rendering said receiving apparatus unresponsive to received signals, and apparatus responsive to said long interval of time for rendering said receiving apparatus responsive to a succeeding series of pulses.

5. A signal receiver comprising means responsive to received signals, means for rendering said means responsive to received signals non-responsive to received signals for a predetermined interval of time following the reception of each signal, blocking means for normally preventing the operation of said means responsive to received signals, means responsive to the absence of received signals for disabling said blocking means.

6. A signal receiver comprising means responsive to repeated series of signals in which the series are separated from each other by a blank interval including receiving apparatus for receiving signals, equipment interconnected with said receiving apparatus for normally rendering said receiving apparatus non-responsive to received signals, apparatus connected with said receiving apparatus responsive to said blank interval for rendering said receiving apparatus responsive to said received signals, apparatus for counting the total number of signals in a series of signals, means for recording the received signals, means responsive to a predetermined number of received signals of a series interconnected with said receiving apparatus and with said apparatus for counting and with said means for recording received signals for utilizing the recorded signals.

7. A signal receiver comprising means responsive to repeated series of signals in which the series are separated from each other by a blank interval said means including receiving apparatus for recording received signals, equipment connected with said receiving apparatus for normally rendering said receiving apparatus non-responsive to received signals, apparatus responsive to said blank interval and interconnected with said equipment for rendering said receiving apparatus responsive to said received signals, apparatus for counting the total number of signals in a series of received signals, interconnecting means for interconnecting said receiving apparatus and said apparatus for counting, apparatus responsive to any number of received signals other than a predetermined number of signals interconnected with said receiving apparatus for discarding received signals.

8. A signal receiver comprising means responsive to repeated series of signals in which the series are separated from each other by a blank interval, storing apparatus for storing received signals, equipment for normally rendering said storing apparatus non-responsive to received signals, apparatus responsive to said blank interval for rendering said storing apparatus responsive to said received signals, apparatus responsive to a number of received signals of a series other than a predetermined number of signals for conditioning said storing apparatus for response to a succeeding series of said signals and interconnecting means for operatively interconnecting said means responsive to repeated series of signals and said storing apparatus and said apparatus responsive to said blank interval and said apparatus responsive to a number of received signals.

9. A signal receiver comprising apparatus responsive to variably spaced signals, translating apparatus for translating said variably spaced signals into variable numbers of pulses, means for storing the number of said pulses, second storage means for storing the number of said pulses and apparatus responsive to a predetermined number of said received signals for transferring the number of pulses stored in said first storage means to said second storage means.

10. A signal receiver comprising apparatus responsive to variably spaced signals, translating apparatus for translating said variably spaced signals into variable numbers of pulses, means for storing the number of said pulses, apparatus responsive to any number of received signals other than a predetermined number of received signals for discarding the number of pulses stored in such storage means.

11. A signal receiver comprising apparatus responsive to variably spaced signals, translating apparatus for translating said variably spaced signals into variable numbers of pulses, means for storing the numbers of said pulses, apparatus responsive to any number of received signals other than a predetermined number for conditioning said storing apparatus to respond to a succeeding series of received signals.

12. In combination a signal receiver comprising a plurality of double stability circuits for counting pulses, storage means for storing the number of said pulses, apparatus responsive to received signals for restoring said double stability circuits to an initial condition comprising a short-circuited inductance element connected in series with a source of energy for said double stability circuits, and means responsive to said received signals for temporarily removing the short circuit from around said inductance.

13. A signal receiver comprising apparatus responsive to variably spaced signals, translating apparatus for translating said variably spaced signals into variable numbers of pulses, a plurality of electron discharge devices connected in double stability circuits controlled by received signals, a source of anode supply energy for said electron discharge devices, apparatus responsive to a number of received signals other than a predetermined number of received signals for restoring said double stability circuit to normal, comprising a short-circuited inductance connected in said anode supply for certain of said electron discharge devices, and means for temporarily removing the short circuit from around said inductance.

14. A plurality of electron discharge devices arranged in a double stability circuit, each of said devices having an anode, a source of anode potential for each of said devices, a short-circuited inductance connected in series with the anode supply of at least one of said devices, and a switching device for temporarily removing said short circuit from around said inductance for restoring said double stability circuit to its initial condition.

15. A plurality of electron discharge devices arranged in double stability circuits, each of said devices having an anode, a source of anode potential for each of said devices, a short-circuited inductance connected in series with the anode supply of at least one of said devices, and switching means for temporarily removing said short circuit from around said inductance for restoring said double stability circuits to their initial conditions, and a resistance connected in parallel with said inductance for controlling the potential developed across said inductance when said short circuit is temporarily interrupted.

16. A signal receiver comprising apparatus responsive to variably spaced signals, translating apparatus for translating said variably spaced signals into variable numbers of pulses, a plurality of double stability circuits for counting the numbers of said pulses, pulse generating apparatus for restoring said circuits to normal, comprising an inductance connected to said double stability circuits, a short circuit connected around said inductance, and switching means for temporarily removing said short circuit.

17. In a switching system, a call signal receiver comprising in combination means responsive to received call signals, a multivibrator vacuum tube apparatus and circuits operative between pairs of call signals for determining the time interval between the individual signals of said pairs of received call signals, means controlled by the total number of call signals received for discarding the time intervals determined by said multivibrator apparatus.

18. In a switching system, a call signal receiver comprising means for responding to signals variably spaced in time including apparatus responsive to received signals, pulse generating equipment, means responsive to a received calling signal for initiating the operation of said pulse generating equipment, other apparatus responsive to the next succeeding similar received signal for stopping the operation of said pulse generating equipment, counting apparatus for counting the number of pulses generated by said pulse generating equipment between said signals, means operating independently of said counting apparatus for counting the total number of received signals, and apparatus responsive to a plurality of different numbers of total signals received for automatically restoring said counting means to a predetermined condition.

19. A signal receiver comprising selective means for responding to one repetition of a repeatedly transmitted series of signals, apparatus operating independently of said selective means for checking the number of received signals in one of said series of signals and means controlled by said apparatus operating independently of said selective means for conditioning said selective means for response to a succeeding series of said repeatedly transmitted series of signals.

20. A signal receiver for responding to repeatedly transmitted series of signals in which the signals of each series are variably spaced in time comprising apparatus responsive to received signals, pulse generating equipment, means responsive to a received signal for initiating the operation of said pulse generating equipment, other apparatus responsive to the next succeeding similar signal for stopping the operation of said pulse generating equipment, means for counting the number of pulses generated by said pulse generating equipment between said signals, other apparatus for counting the total number of signals of a series of said repeatedly transmitted signals, and apparatus responsive to a greater or smaller number of signals than a predetermined number for conditioning said apparatus responsive to received signals to respond to a succeeding series of said repeatedly transmitted signals.

21. A plurality of electron discharge devices arranged in a double stability circuit each of said devices having an anode, a source of anode potential, a short-circuited inductance connected in series with said source of anode potential for at least one of the said electron discharge devices, manually operable switching means for temporarily removing said short circuit from around said inductance for restoring said double stability circuit to its initial condition.

22. A plurality of electron discharge devices arranged in double stability circuits, each of said devices having an anode, a source of anode potential for said devices interconnected with the anodes of said devices, a short-circuited inductance connected in series with the anode supply of at least one of said devices and manually operable switching means for temporarily removing said short circuit from around said inductance for restoring said double stability circuits to their initial conditions, a resistance connected in parallel with said inductance for controlling the potential developed across said inductance when said short circuit is temporarily interrupted.

23. A signal receiver comprising apparatus responsive to variably spaced signals, translating apparatus for transmitting said variably spaced signals into variable numbers of pulses, a plurality of double stability circuits for counting the numbers of said pulses, pulse generating apparatus for restoring said circuits to normal comprising an inductance, a short circuit connected around said inductance, switching means for setting said double stability circuits in a predetermined condition prior to counting the number of said pulses by temporarily interrupting said short circuit.

24. A plurality of electron discharge devices arranged in double stability circuits each of said devices having an anode, a source of anode potential, interconnections extending between said anodes and said source of anode potential, a short-circuited inductance connected in series with the anode supply of at least one of said devices, switching means controlled by said electron discharge devices for temporarily removing said short circuit from around said inductance for restoring said double stability circuits to their initial condition.

25. A signal receiver responsive to pairs of pulses the individual pulses of which are variably spaced comprising translating apparatus for translating the pulses of said pairs of pulses into variable numbers of pulses, a plurality of double stability circuits for counting the number of said pulses, pulse generating apparatus for actuating said double stability circuits to a predetermined condition including an inductance, a short circuit connected around said inductance and switching means controlled by the number of pulses counted by said double stability circuits for temporarily removing said short circuit.

WILLIAM A. MALTHANER.
NEAL D. NEWBY.
HENRY E. VAUGHAN.

References Cited in the file of this patent

UNITED STATES PATENTS

| Number | Name | Date |
|---|---|---|
| 1,498,544 | Fowler | June 24, 1924 |
| 1,504,275 | Scudder | Aug. 12, 1924 |
| 1,661,748 | Chauveau | Mar. 6, 1928 |
| 1,708,989 | White | Apr. 16, 1929 |
| 1,867,209 | Chauveau | July 12, 1932 |
| 1,882,010 | Hershey | Oct. 11, 1932 |
| 1,913,188 | Bruckel et al. | June 6, 1933 |
| 2,074,037 | Watson | Mar. 16, 1937 |
| 2,225,680 | Boswau | Dec. 24, 1940 |
| 2,276,646 | Boswau | Mar. 17, 1942 |
| 2,308,778 | Prince | Jan. 19, 1943 |
| 2,391,868 | Angel | Jan. 1, 1946 |
| 2,407,320 | Miller | Sept. 10, 1946 |
| 2,442,403 | Flory | June 1, 1948 |
| 2,457,149 | Herbst | Dec. 28, 1948 |
| 2,471,473 | Young | May 31, 1949 |

OTHER REFERENCES

Electronics Magazine of June 1944, pgs. 110–113.